US011614339B2

United States Patent
Ito et al.

(10) Patent No.: US 11,614,339 B2
(45) Date of Patent: Mar. 28, 2023

(54) INFORMATION PROCESSING DEVICE AND RECORDING MEDIUM

(71) Applicant: MICWARE CO., LTD., Kobe (JP)

(72) Inventors: Makoto Ito, Kobe (JP); Michihiro Nishida, Kobe (JP)

(73) Assignee: MICWARE CO., LTD., Kobe (JP)

( * ) Notice: Subject to any disclaimer, the term of this patent is extended or adjusted under 35 U.S.C. 154(b) by 179 days.

(21) Appl. No.: 17/182,440

(22) Filed: Feb. 23, 2021

(65) Prior Publication Data

US 2021/0172746 A1    Jun. 10, 2021

Related U.S. Application Data

(62) Division of application No. 15/951,702, filed on Apr. 12, 2018, now Pat. No. 10,969,230.

(30) Foreign Application Priority Data

Apr. 13, 2017  (JP) .............................. JP2017-080129
Oct. 10, 2017  (JP) .............................. JP2017-197149

(51) Int. Cl.
*G01C 21/36*   (2006.01)
*G01C 21/00*   (2006.01)
(Continued)

(52) U.S. Cl.
CPC ....... *G01C 21/3881* (2020.08); *G01C 21/005* (2013.01); *G01C 21/367* (2013.01);
(Continued)

(58) Field of Classification Search
CPC . G06T 11/001; G06T 11/203; G06T 2200/24; G09B 29/007; H04W 4/021;
(Continued)

(56) References Cited

U.S. PATENT DOCUMENTS 4,175,285 A   11/1979   Dansac et al.
4,963,865 A   10/1990   Ichikawa et al.
(Continued)

FOREIGN PATENT DOCUMENTS

JP   2003-42783 A    2/2003
JP   2003-214887 A   7/2003
(Continued)

OTHER PUBLICATIONS

Japanese Office Action for Japanese Application No. 2020-087336, dated May 25, 2021, with English translation.
(Continued)

*Primary Examiner* — Richard M Camby
(74) *Attorney, Agent, or Firm* — Birch, Stewart, Kolasch & Birch, LLP

(57) ABSTRACT

An information processing device includes a display configured to display a mesh of mesh information based on longitude and latitude. A mesh is composed of a plurality of blocks. The mesh information includes area information about a traveling area where a moving body can travel. The area information is the additional information added to each of the plurality of blocks. The additional information is the display information that is weighted and sorted, based on the number of overlapping points of the plurality of locus logs.

4 Claims, 28 Drawing Sheets

(51) Int. Cl.
  *H04W 4/021* (2018.01)
  *G06T 11/00* (2006.01)
  *G06T 11/20* (2006.01)
  *G09B 29/00* (2006.01)
  *H04W 4/44* (2018.01)

(52) U.S. Cl.
  CPC ..... *G01C 21/3697* (2013.01); *G01C 21/3878* (2020.08); *G06T 11/001* (2013.01); *G06T 11/203* (2013.01); *G09B 29/007* (2013.01); *H04W 4/021* (2013.01); *G06T 2200/24* (2013.01); *H04W 4/44* (2018.02)

(58) Field of Classification Search
  CPC ... H04W 4/44; G01C 21/3881; G01C 21/005; G01C 21/367; G01C 21/3697; G01C 21/3878; G01C 21/32
  See application file for complete search history.

(56) References Cited

U.S. PATENT DOCUMENTS

| | | | |
|---|---|---|---|
| 5,031,104 | A | 7/1991 | Ikeda et al. |
| 5,884,217 | A | 3/1999 | Koyanagi |
| 6,233,521 | B1 | 5/2001 | Nomura |
| 6,792,349 | B1 | 9/2004 | Chen et al. |
| 8,279,239 | B1 | 10/2012 | Jensen et al. |
| 8,970,628 | B1 | 3/2015 | Jensen et al. |
| 9,642,167 | B1 * | 5/2017 | Snyder ................ H04L 65/1094 |
| 10,321,275 | B1 | 6/2019 | Orlov et al. |
| 2012/0148102 | A1 | 6/2012 | Moriguchi et al. |
| 2012/0239290 | A1 | 9/2012 | Fujita |
| 2013/0285855 | A1 * | 10/2013 | Dupray ................ H04W 4/029 342/451 |
| 2017/0052029 | A1 * | 2/2017 | Ninomiya ............ G01C 21/203 |
| 2018/0043976 | A1 | 2/2018 | Nakamoto et al. |

FOREIGN PATENT DOCUMENTS

| | | |
|---|---|---|
| JP | 2004-266898 A | 9/2004 |
| JP | 2004-333464 A | 11/2004 |
| JP | 2010-139386 A | 6/2010 |
| JP | 2011-170166 A | 9/2011 |
| JP | 2013-29345 A | 2/2013 |
| JP | 2014-228389 A | 12/2014 |
| JP | 2015-14679 A | 1/2015 |
| JP | 2016-118705 A | 6/2016 |
| JP | 2016-206424 A | 12/2016 |
| JP | 2017-41071 A | 2/2017 |
| WO | WO 2011/021588 A1 | 2/2011 |
| WO | WO 2011/067842 A1 | 6/2011 |
| WO | WO 2014/103079 A1 | 7/2014 |

OTHER PUBLICATIONS

Japanese Office Action for Japanese Application No. 2017-080129, dated Oct. 29, 2019, with English translation.
Japanese Office Action for Japanese Application No. 2017-197149, dated Nov. 19, 2019, with English translation.
Japanese Office Action, dated Mar. 23, 2018, for Japanese Application No. 2017-109648, with Machine Translation.

* cited by examiner

Fig.18A

| TRAVELING RESULT DB | | | 223 |
|---|---|---|---|
| MANAGEMENT NUMBER | DATE | DEPARTURE TIME | |
| 00001 | MAY 5, 2017 | 14:00 | |
| 00002 | MAY 5, 2017 | 14:30 | |
| ⋮ | ⋮ | ⋮ | |

Fig.18B

| LOCUS LOG (No. 0001) | | |
|---|---|---|
| TIME | LATITUDE | LONGITUDE |
| 14:00:00 | 34.XX | 135.XX |
| 14:00:01 | 34.XX | 135.XX |
| 14:00:02 | 34.XX | 135.XX |
| ⋮ | ⋮ | ⋮ |

MESH DB OF FIRST SCALE

MESH DB OF SECOND SCALE

INFORMATION PROCESSING DEVICE AND RECORDING MEDIUM

CROSS-REFERENCE TO RELATED APPLICATIONS

This application is a Divisional of copending U.S. application Ser. No. 15/951,702, filed on Apr. 12, 2018, which claims priority under 35 U.S.C. § 119(a) to Application Nos. 2017-080129 and 2017-197149, filed in Japan on Apr. 13, 2017 and Oct. 10, 2017 respectively, all of which are hereby expressly incorporated by reference into the present application.

BACKGROUND

1. Technical Field

The present invention relates to an information processing device for processing information about traveling of a moving body and a recording medium.

2. Related Art

In recent years, in an information processing device for displaying a map, a current position of the moving body is displayed on the map using a Global Positioning System (GPS). A route suitable for movement of the moving body is displayed on a road used for general traffic displayed on the map.

A navigation device that guides and displays the route suitable for the traveling of the moving body, such as a vehicle, is known as this type of information processing device (for example, see JP 2014-228389 A and JP 2003-42783 A).

The navigation device of JP 2014-228389 A accumulates a movement locus of a current position in order to be able to recognize whether there is a road on which the moving body has not traveled yet. When a display control unit of the navigation device checks existence of a road that does not correspond to the movement locus based on the accumulated movement locus, the display control unit performs display control of a specific mode such as a change of brightness of a display color for the checked portion.

In the navigation device of JP 2003-42783 A, in order to improve convenience of a user, route movement history information can be used in other devices, thereby enabling the user to perform modification and editing. The route movement history information about the navigation device is configured to be readable, correctable and editable by a personal computer or the like. The route movement history information is configured to be redistributed through the Internet.

SUMMARY

It is conceivable to apply the information processing device to a moving body, such as a buggy, which can travel through natural fields such as a sand dune and a mountain forest. In the sand dunes, mountain forests, and the like of the natural field, there are few paths used for general traffic in order to preserve an environment. Consequently, there are few paths displayed in the natural field on the map.

Therefore, instead of the path used for the general traffic, it is conceivable to display the traveling area suitable for the movement of the moving body on the map as a virtual path.

However, it is necessary to previously measure a terrain of the natural field in order to display the path suitable for the movement of the moving body on the map as the virtual path. For this reason, it takes a lot of labor and burden to create the virtual path.

In the natural field, the terrain may change depending on an external environment, and the virtual path may be blocked. For example, the terrain may change due to wind, and the virtual path may be blocked by fallen trees or the like. In an area where a dry season and a rainy season exist, both a defamation of a terrain in which the virtual path submerges in water and the blocking of the virtual path may occur at the same time depending on time. Thus, it is difficult to previously set the virtual path under an influence of the external environment.

An object of the present invention is to provide an information processing device that can easily set the path on which the moving body can travel as a traveling area which is a virtual path.

According to a first aspect of the present invention, an information processing device including a display configured to display a mesh of mesh information based on longitude and latitude is provided. A mesh is composed of a plurality of blocks. The mesh information includes area information about a traveling area where a moving body can travel. The area information is the additional information added to each of the plurality of blocks. The additional information is the display information that is weighted and sorted, based on the number of overlapping points of the plurality of locus logs.

According to a second aspect of the present invention, a non-transitory computer readable recording medium to make a computer display a mesh of mesh information based on longitude and latitude is provided. A mesh is composed of a plurality of blocks. The mesh information includes area information about a traveling area where a moving body can travel. The area information is the additional information added to each of the plurality of blocks. The additional information is the display information that is weighted and sorted, based on the number of overlapping points of the plurality of locus logs.

According to a third aspect of the present invention, an information processing device configured to display information indicating a traveling area where a moving body can travel is provided. The information processing device includes a display and a controller. The display has a display screen that displays an image. The controller causes the display to display a mesh image generated according to mesh information defined by a position coordinate. The mesh information includes a plurality of blocks each having a value relating to a traveling area. Based on the mesh information, the controller displays the blocks, which are adjacent to each other when values of adjacent blocks belong to an identical classification, as a grouped block using a display attribute in the mesh image.

BRIEF DESCRIPTION OF DRAWINGS

FIG. 18A is a view illustrating a traveling result database in the information processing system according to the third embodiment;

FIG. 18B is a view illustrating the traveling result database in the information processing system according to the third embodiment;

DETAILED DESCRIPTION OF PREFERRED EMBODIMENTS

Figure 1:
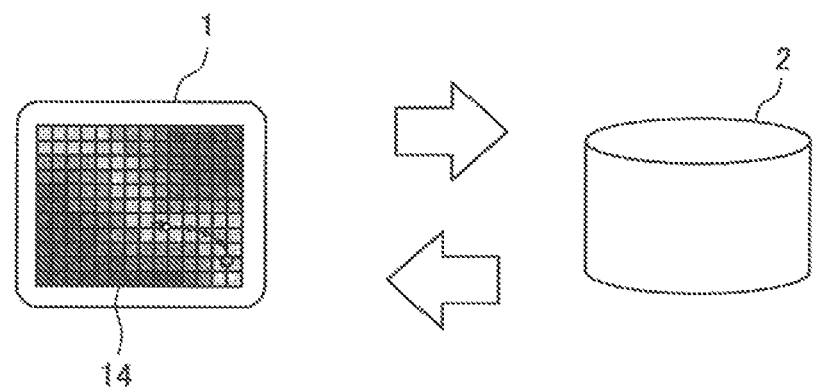
FIG. 1 is a schematic configuration diagram of an information processing system according to a first embodiment.

Hereinafter, an information processing device according to exemplary embodiments will be described with reference to the accompanying drawings. In each of the following embodiments, the same constituent is denoted by the same reference numeral.

First Embodiment

As illustrated in FIG. 1, an information processing system according to a first embodiment includes an information processing device 1 and a server 2, and the information processing device 1 and the server 2 are connected so as to be able to communicate wirelessly with each other.

Figure 2:
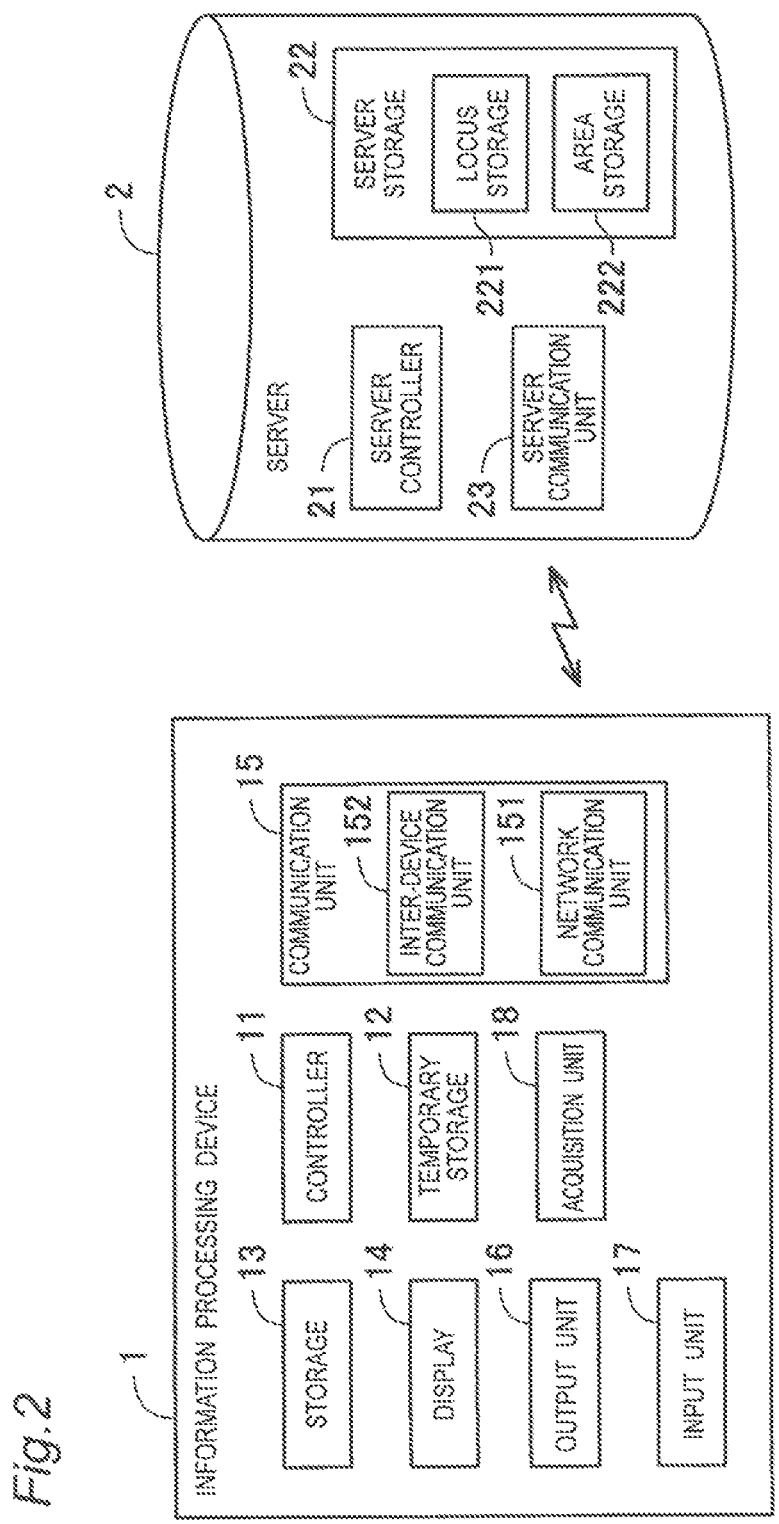
FIG. 2 is a schematic configuration block diagram of the information processing system according to the first embodiment.

As illustrated in FIG. 2, the information processing device 1 performs processing based on a navigation program stored in a storage 13 by a navigation function included in a controller 11.

As illustrated in FIG. 2, the information processing device 1 includes the controller 11, a temporary storage 12, the storage 13, a display 14, a communication unit 15, an output unit 16, an input unit 17, and an acquisition unit 18.

The storage 13 includes the navigation program. A Central Processing Unit (CPU) drives the controller 11 based on the navigation program, which allows the controller 11 to exhibit the navigation function. The controller 11 has, but is not limited to, a function of guiding a route to a destination as the navigation function. The controller 11 may simply display a traveling area as a virtual path, or may simply perform map drawing. Alternatively, the controller 11 may perform mesh drawing.

Information generated and/or controlled by the controller 11 is temporarily stored in the temporary storage 12. A volatile memory is used as the temporary storage 12. An example of the volatile memory includes a Random Access Memory (RAM). Information generated through the processing of the controller 11 is temporarily stored in the temporary storage 12.

For example, the storage 13 is configured by a storage in which the navigation program and various pieces of information necessary for navigation are recorded. The various pieces of information include mesh information and map information based on longitude and latitude. The map information includes information, such as a map, a natural field, and a facility, which is necessary for construction of the map. The storage 13 includes a nonvolatile memory such as a Read Only Memory (ROM), a flash memory, and a Hard Disk Drive (HDD). For example, the storage 13 has regional information such as Point Of Interest (POI) information.

Figure 4:
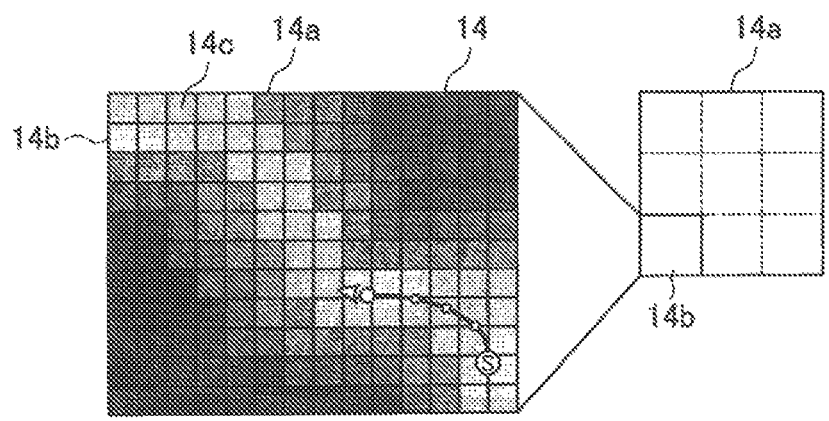
FIG. 4 illustrates mesh information displayed on the display of the information processing device according to the first embodiment.

As illustrated in FIG. 4, the display 14 displays a mesh 14a of the mesh information based on the longitude and the latitude. The display 14 is configured by a touch panel. The touch panel has an input function in which a user performs the input by touching a screen of the display 14. In other words, the touch panel is a display device in which a touch type input function and a panel type display function are combined. A mesh 14a is composed of a plurality of hierarchies. The mesh 14a in each hierarchy is composed of a plurality of blocks 14b.

Figure 3:
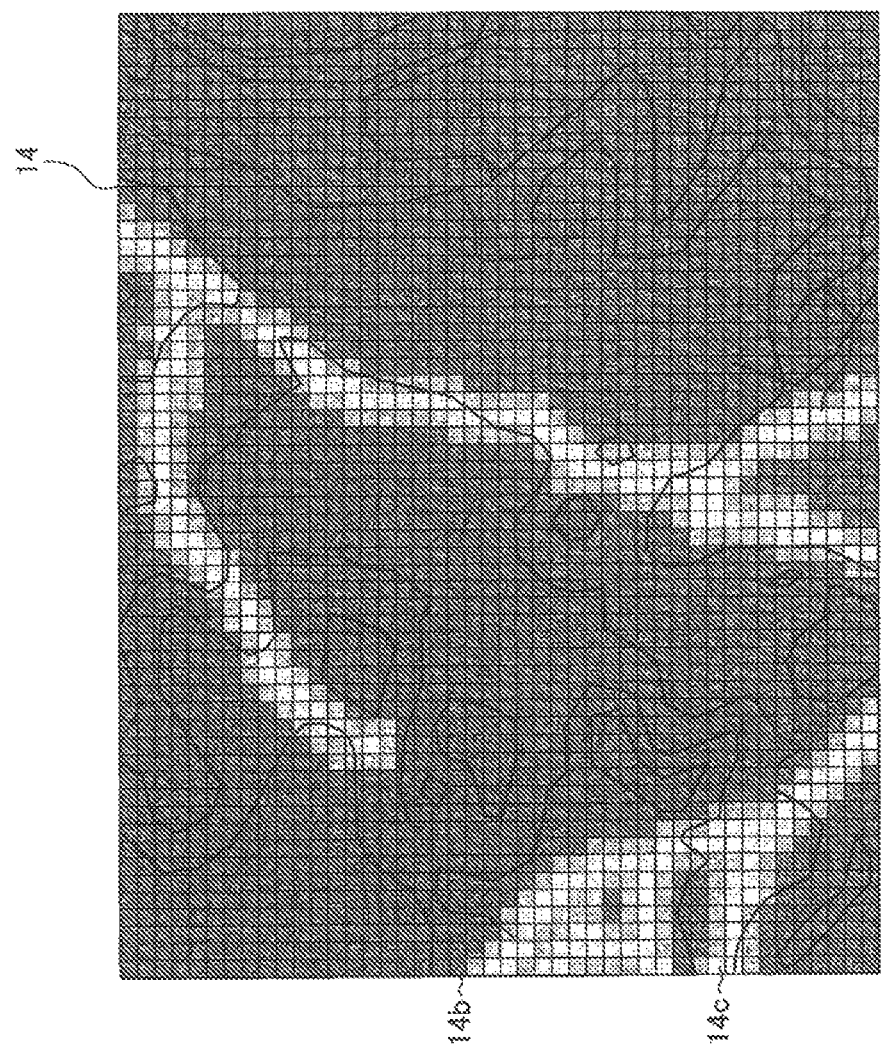
FIG. 3 illustrates map information displayed on a display of the information processing device according to the first embodiment.

For example, the mesh information in FIG. 4 includes the map in FIG. 3 and the area information about a traveling area 14c in FIG. 4 where a vehicle equipped with the information processing device 1 can travel. The area information is additional information added in each of the plurality of blocks 14b. The additional information is information that is weighted and color-coded, based on the number of overlapping points of a plurality of locus logs. In the first embodiment, the additional information is weighted such that the color of the additional information becomes lighter as the number of overlapping points of the plurality of locus logs increases. Specifically, the controller 11 makes the color of the block 14b in which the locus log exists lighter, and enhances the brightness of the block 14b such that the color of the additional information comes closer to white as the locus log increases in proportion to the number of overlapping points of the locus logs. The controller 11 displays the block 14b on the display 14. As used herein, the overlapping point of the locus log means a point where the plurality of locus logs exist in one block 14b. The controller 11 can set the light-colored block 14b as the virtual path by color-coding each block 14b. In the first embodiment, the controller 11 weights each block 14b by color coding. However, the present invention is not limited thereto. For example, the controller 11 may weight each block 14b by changing a density of a grid pattern. By color-coding each block 14b, the information processing device 1 can relatively easily set the virtual path compared to the case where a path on which a moving body 5 can actually move is measured. The display 14 of the first embodiment is configured by, but is not limited to, a touch panel. For example, the display 14 may be configured by a display having a simple displaying function. The display 14 is configured by a liquid crystal display device, an organic Electro Luminescence (EL) device, or the like.

The display 14 displays a start position where the vehicle equipped with the information processing device 1 starts the movement, positional information indicating the current position of the vehicle, and a movable area which is a range where the vehicle is movable from the current position. Hereinafter, the current position is occasionally referred to as a current location. In FIG. 4, the start position is indicated by a mark S and the current position is illustrated by an arrow. In FIG. 4, the positional information about the moving body 5 is indicated by an outlined circle. A plurality of pieces of positional information is illustrated while connected to each other with a line. A scale of each block 14b displayed on the display 14 is arbitrarily set in each layer of the mesh 14a of the mesh information. FIG. 4 illustrates a part of the mesh 14a in a plurality of hierarchies included in the mesh information. FIG. 4 illustrates a part of a primary mesh arranged in a 3-by-3 matrix as a secondary mesh block 14b arranged in an 11-by-14 matrix. The block 14b of the primary mesh arranged in the 3-by-3 matrix in FIG. 4 is set to 6 km by 6 km. The block 14b of the secondary mesh arranged in the 11-by-14 matrix in FIG. 4 is set to 20 m by 20 m. The block 14b of the primary mesh is not limited to the case where the block 14b of the primary mesh is set to 6 km by 6 km. The block 14b of the secondary mesh is not limited to the case where the block 14b of the secondary mesh is set to 20 m by 20 m. The primary mesh and the secondary mesh may be set to an appropriate size. The primary mesh and the secondary mesh may be set based on the size of the moving body 5. For example, the primary mesh and the secondary mesh may be set to 1.0 times to 3.0 times as large. The primary mesh and the secondary mesh in FIG. 4 are set to, but are not limited to, a rectangular shape. For example, the primary mesh and the secondary mesh may be set to a hexagonal shape.

Figure 8:
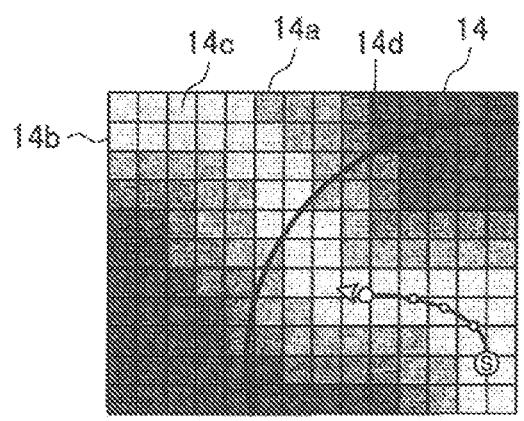
FIG. 8 illustrates the mesh information displayed on a display of an information processing device according to a modification of the first embodiment.
Figure 9:
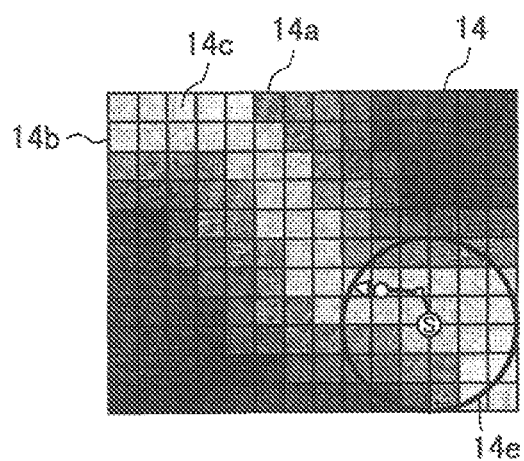
FIG. 9 illustrates the mesh information displayed on a display of an information processing device according to another modification of the first embodiment.

The movable area is a range based on remaining information about an energy source enabling the moving body 5 to travel. As illustrated in FIG. 8, the movable area may be displayed as a circle centered on the start position. In FIG. 8, the display 14 displays, but is not limited to, the current position and a part of the circle indicating the movable area. As illustrated in FIG. 9, the display 14 may display the current position and the whole circle indicating the movable area. In FIG. 9, to display the whole circle indicating the movable area, the controller 11 changes, namely, enlarges or reduces a scale based on the longitude and the latitude of the mesh 14a. The display 14 may display additional information different from the color-coded traveling area 14c as one of the pieces of additional information. For example, the display 14 may display the block 14b, which is positioned in an area where the movement cannot be performed except for the movable area, in black. The display 14 may display a mark indicating the movable area in the block 14b that becomes the movable area.

The communication unit 15 includes a network communication unit 151 that is connected to the server 2 in a wirelessly communicable manner to transmit and receive information. The communication unit 15 includes an inter-device communication unit 152. The inter-device communication unit 152 is configured to be connected to another communication device to be able to transmit and receive information. Specifically, the communication unit 15 transmits and receives information based on wireless communication standards such as optical wireless communication such as infrared communication, Wi-Fi (registered trademark), Bluetooth (registered trademark), BLE (Bluetooth Low Energy), VICS (registered trademark), and 3G or 4G mobile communication.

The output unit 16 includes the display 14 and a sound output device other than the display 14. In the first embodiment, both the display 14 and the sound output device that does not correspond to the display 14 output a warning when the start position is located outside the movable area on the screen of the display 14. An output message of a pop-up system or the like is used as the display on the display 14. The sound output device outputs a warning sound.

The user directly issues an instruction to the information processing device 1 through the input unit 17. For example, the input unit 17 is configured by a touch panel type input device. The input unit 17 is configured such that the user can issue the instruction to the information processing device 1 by inputting characters or by directly touching a segment of the display 14. Although not illustrated, the input unit 17 may be configured such that the user can issue the instruction to the information processing device 1 in a wired or wireless manner through a physical key.

The acquisition unit 18 acquires positional information indicating the current position of the vehicle equipped with the information processing device 1. The acquisition unit 18 of the first embodiment acquires, but is not limited to, the positional information using a GPS. For example, the acquisition unit 18 may be configured to acquire the positional information using an information communication base station. In addition to the positional information, the acquisition unit 18 acquires information about the locus log acquired by another information processing device 1 from the server 2. The locus log includes the positional information about another information processing device 1. The acquisition unit 18 acquires the remaining information about the energy source enabling the vehicle to travel from an energy detection sensor of the vehicle. For example, the energy source is fuel such as gasoline, light oil, and hydrogen in the case where a traveling drive force generation device mounted on the vehicle is an internal combustion engine. In the case where the traveling drive force generation device mounted on the vehicle is an electrically driven engine, the energy source is a battery. The energy source is both a fuel and a battery for a vehicle equipped with both an internal combustion engine and an electrically driven engine. The acquisition unit 18 acquires a locus log including the map information, the mesh information, and the positional information from the server 2.

As illustrated in FIG. 2, the server 2 includes a server controller 21, a server storage 22, and a server communication unit 23.

Based on the plurality of locus logs recorded in the server storage 22, the server controller 21 generates the area information about the traveling area 14c where the vehicle can travel. The server controller 21 sets the locus log that is a generation target of the area information in a time-series range, and generates the area information using a plurality of locus logs included in the time-series range. For example, the server controller 21 sets the locus log that is the generation target of the area information in the range from Jan. 1, 2016 to the present. For example, the server controller 21 may set the locus log that is the generation target of the area information only in the range of a summer season. For example, the server controller 21 may set the locus log that is the generation target of the area information in the range of each of time zones of early morning, daytime, and midnight.

The locus log is a log generated by connecting a plurality of point logs based on the longitude and the latitude.

The area information is generated based on the plurality of locus logs indicating movement loci of a plurality of vehicles. The generated area information is used as additional information added to the mesh information based on the longitude and the latitude. The mesh information includes the meshes 14a in the plurality of hierarchies. The mesh 14a in each hierarchy is composed of the plurality of blocks 14b arranged in a matrix form based on the longitude and the latitude. The area information is additional information added to each block 14b in the mesh information.

The additional information is information weighting the block 14b located at an overlapping point in the loci of the plurality of locus logs based on the overlapping number of locus logs. The display of block 14b is sorted by the weighting. The weighted block 14b is displayed so as to be able to be sorted by color as illustrated in FIG. 4. The purpose of weighting is to vary the display of the block 14b including a plurality of overlapping points based on the number of overlapping points of the plurality of locus logs.

The server controller 21 has a navigation function. The server controller 21 controls operation based on the navigation program stored in the server storage 22. The server controller 21 is configured so as to be able to function by driving the CPU using an appropriate program stored in the server storage 22. The information processing system has two navigation functions, i.e., a navigation function of the controller 11 of the information processing device 1 and a navigation function of the server controller 21 of the server 2. In the information processing system, use of the navigation function of the controller 11 of the information processing device 1 is initially set. Which one of the navigation function of the information processing device 1 and the navigation function of the server 2 is used can be selected by a manual setting of the user. The use of the navigation function is not limited to the use of one of the navigation functions, but both the navigation functions may be shared and used.

Information transmitted from the information processing device 1 is stored in the server storage 22. The server storage 22 includes a locus storage 221 in which the plurality of locus logs of various vehicles communicable with the server 2 are recorded. The plurality of locus logs of various moving bodies 5 may be a locus log generated by the movements of the different moving bodies 5 or a locus log generated by different movements of the same moving body 5. The different movements of the same moving body 5 may be defined as a movement counted as one time from when the engine of the vehicle is turned on until the engine is turned off, for example, in the case where the moving body 5 is a vehicle. The server storage 22 includes an area storage 222 in which the area information about the traveling area 14c generated based on the plurality of locus logs is stored. The server storage 22 is a storage in which the navigation program or various pieces of information necessary for navigation are stored. A nonvolatile memory such as a ROM is used as the server storage 22. Examples of the nonvolatile memory include a flash memory and a Hard Disk Drive (HDD). The plurality of locus logs of various moving bodies 5 may be recorded in the server storage 22 while classified in each type of the moving body 5. The server storage 22 stores, for example, the locus log generated by the movement of the moving body 5 according to a type of an All Terrain Vehicle (ATV) such as a three-wheel ATV, a four-wheel ATV, and a six-wheel ATV.

The server communication unit 23 is connected to the information processing device 1 in a wirelessly communicable manner to transmit and receive information. The server communication unit 23 transmits and receives the information based on communication standards such as VICS (registered trademark) and 3G or 4G mobile communication.

Figure 5:
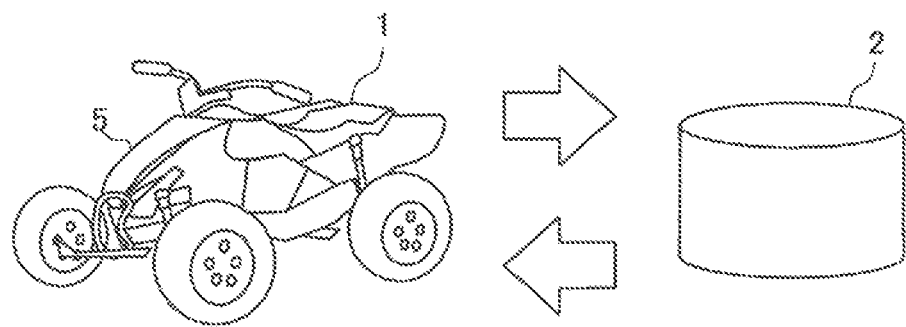
FIG. 5 is a schematic configuration diagram of the information processing system according to the first embodiment.

An operation to generate the traveling area 14c based on the locus log in the information processing system will be described below with reference to FIGS. 5 and 6. In the description of the generation of the traveling area 14c, a buggy vehicle is used as an example of the moving body 5 as illustrated in FIG. 5.

The user powers on the information processing device 1. The power-on and power-off of the information processing device 1 may be interlocked with power-on and power-off of the vehicle. When the information processing device 1 is powered on, the controller 11 activates navigation software (step S101).

After the navigation software is activated, the user moves the vehicle from the start position. In FIG. 4, the start position is indicated by the mark S. While the user moves the moving body 5, the acquisition unit 18 acquires the locus log (step S102).

After the user moves the vehicle and returns the vehicle to the start position, the controller 11 ends the navigation software (step S103).

When the controller 11 ends the navigation software in step S103, the information processing device 1 checks whether the information processing device 1 is connected to the server 2 through the network (step S104).

When the information processing device 1 is connected to the server 2 (YES in step S104), the information processing device 1 transmits all the pieces of log data of the locus log to the server 2 (step S105).

When the information processing device 1 is not connected to the server 2 (NO in step S104), the information processing device 1 establishes connection to the server 2 (step S106), and transmits all the pieces of log data of the locus log (step S105).

In step S105, the information processing device 1 collectively transmits all the pieces of log data of the locus log to the server 2, but the present invention is not limited thereto. For example, the information processing device 1 may transmit the log data to the server 2 every time the log data of the locus log is acquired in step S102. In the case where the log data is transmitted every time the log data of the locus log is acquired, the information processing device 1 may not check the connection to the server 2 in step S104.

When the information processing device 1 transmits the locus log to the server 2, the server 2 receives the locus log through the server communication unit 23 (step S107).

Then, the server controller 21 determines whether all the pieces of data of the locus log are continuous (step S108). Specifically, the server controller 21 applies the locus log to the mesh 14a to determine whether the block 14b having no point log exists.

In step S108, when determining that the block 14b having the point log is continuous, the server controller 21 determines that all the pieces of data of the locus log is continuous, and stores the locus log in the locus storage 221 of the server storage 22.

The server controller 21 generates the area information about the traveling area 14c using the plurality of locus logs stored in the server storage 22 (step S109).

In step S109, the server controller 21 generates the area information about the traveling area 14c based on the plurality of locus logs. The area information is the additional information added to each of the plurality of blocks 14b constituting the mesh 14a based on the longitude and the latitude. The additional information is information weighting the block 14b located at the overlapping point in the locus of each of the plurality of locus logs based on the overlapping number of locus logs. The server controller 21 classifies each block 14b into, for example, five stages of 0 times, 5 times, 10 times, 30 times, and 100 times. The server controller 21 stores shading display information indicating shading of the block 14b in the information about the block 14b as the additional information such that the color of the block 14b is made lighter in order of the number of times based on the classified five-stage information. In the first embodiment, the addition of the shading display information about the block 14b is referred to as weighting. The server controller 21 makes the color of the block 14b lighter in the order of the number of times based on the five-stage information, so that the traveling area 14c in which the vehicle can travel can easily be recognized.

On the other hand, when determining that all the pieces of data of the locus log are not continuous in step S108, the server controller 21 generates a virtual log to complement the log such that all the pieces of data of the locus log are continuous (step S110). Hereinafter, the virtual log is referred to as a complementary log. When the acquisition unit 18 is configured using a GPS, the acquisition unit 18 acquires the positional information about the current position at predetermined time intervals. When a speed of the vehicle increases, the acquisition unit 18 may generate the block 14b that does not overlap the locus of the locus log. When determining that the speed of the vehicle is equal to or higher than a predetermined speed, and determining that all the pieces of data of the locus log are not continuous, the server controller 21 can generate the virtual log such that the blocks 14b adjacent to each other are continuous based on, for example, the positional information and the time information.

In step S110, when determining that the block 14b in which the point log exists is not continuous and determining that all the pieces of data of the locus log are not continuous, the server controller 21 stores the complementary log in the block 14b in which the point log does not exist. After the server storage 22 stores the complementary log, the server controller 21 generates the area information about the traveling area 14c based on the locus log (step S109).

In step S109, the server controller 21 stores the generated area information about the traveling area 14c in the area storage 222 of the server storage 22 (step S111).

Then, the server controller 21 determines whether the color of each block 14b constituting the mesh information is updated based on the area information about the traveling area 14c (step S112).

When updating of the color of the block 14b is necessary in step S112, the server controller 21 updates the color of the block 14b (step S113), updates the mesh 14a by updating the colors of all the blocks 14b (step S114), and ends the generation of the traveling area 14c.

When updating of the color of the block 14b is not necessary in step S112, the generation of the traveling area 14c is ended without updating the mesh 14a.

As described above, the server controller 21 weights the block 14b when generating the traveling area 14c. According to the weighting of the first embodiment, the server controller 21 weights each block 14b based on the number of overlapping points of the plurality of locus logs. The information processing device 1 can vary the display of the block 14b including overlapping points as illustrated in FIG. 4.

As described above, the information processing system of the first embodiment includes the information processing program implementing the storage step of recording the plurality of locus logs of the vehicle and the generation step of generating the area information about the traveling area 14c where the vehicle can travel based on the plurality of locus logs recorded in the storage step.

The display of the traveling area 14c using the locus log in the information processing system will be described below with reference to FIG. 7.

The user powers on the information processing device 1. The power-on and power-off of the information processing device 1 may be interlocked with power-on and power-off of the vehicle. When the information processing device 1 is powered on, the controller 11 activates the navigation software (step S201).

After the navigation software is activated, the information processing device 1 checks whether the information processing device 1 is connected to the server 2 through the network (step S202).

When the information processing device 1 is not connected to the server 2 (No in step S202), the information processing device 1 establishes the connection to the server 2.

When the information processing device 1 is connected to the server 2 (YES in step S203), the information processing device 1 requests the server 2 to update the mesh information (step S204). In the case where the communication is not established, the information processing device 1 may display the latest traveling area 14c stored in the storage 13.

When the instruction command from the server 2 to the information processing device 1 is a command that an update mesh exists (YES in step S205), the information processing device 1 receives the update data of the mesh 14a from the server 2 (step S206). At this point, the information processing device 1 receives the update data in each block 14b in each hierarchy of the mesh 14a.

The information processing device 1 updates the block 14b in step S206, and updates the mesh 14a by updating the plurality of blocks 14b. After updating the mesh 14a, the information processing device 1 displays the updated mesh 14a on the display 14. At this point, the information processing device 1 displays the current position of the vehicle equipped with the information processing device 1 and the map on the display 14.

On the other hand, when the instruction command from the server 2 to the information processing device 1 is a command that the update mesh does not exist (NO in step S205), the information processing device 1 transitions to step S207 to display the current mesh 14a, the current location, and the map on the display 14.

After displaying the current position in step S207, the information processing device 1 displays the traveling area 14c (step S208).

When the area information of the traveling area 14c exists, the information processing device 1 displays the traveling area 14c on the display 14 (YES in step S208). On the other hand, when the area information about the traveling area 14c does not exist, the information processing device 1 does not display the traveling area 14c on the display 14 (NO in step S208).

Then, the information processing device 1 displays the start position (start point) (step S209).

When the information about the start point exists, the information processing device 1 displays the start point on the display 14 (YES in step S209). On the other hand, when the information about the start point does not exist, the information processing device 1 does not display the start point on the display 14 (NO in step S209).

Then, the information processing device 1 displays the movable area based on a remaining amount of energy source of the vehicle (step S210).

When the information about the movable area exists, the information processing device 1 displays the movable area in FIGS. 8 and 9 on the display 14 (YES in step S210). On the other hand, when the information about the movable area does not exist, the information processing device 1 does not display the movable area on the display 14 (NO in step S210).

Then, the information processing device 1 displays the map (step S211).

When the map information exists, the information processing device 1 displays at least the map, the mesh 14a, and the current location on the display 14 (YES in step S211). On the other hand, when the map does not exist, the information processing device 1 displays at least the mesh 14a and the current location on the display 14 (NO in step S211).

When the movement of the vehicle is completed, the information processing device 1 ends the navigation software (step S212).

As described above, the information processing device 1 of the first embodiment has the information processing program implementing the display step of displaying the mesh 14a based on the longitude and the latitude.

Figure 6:
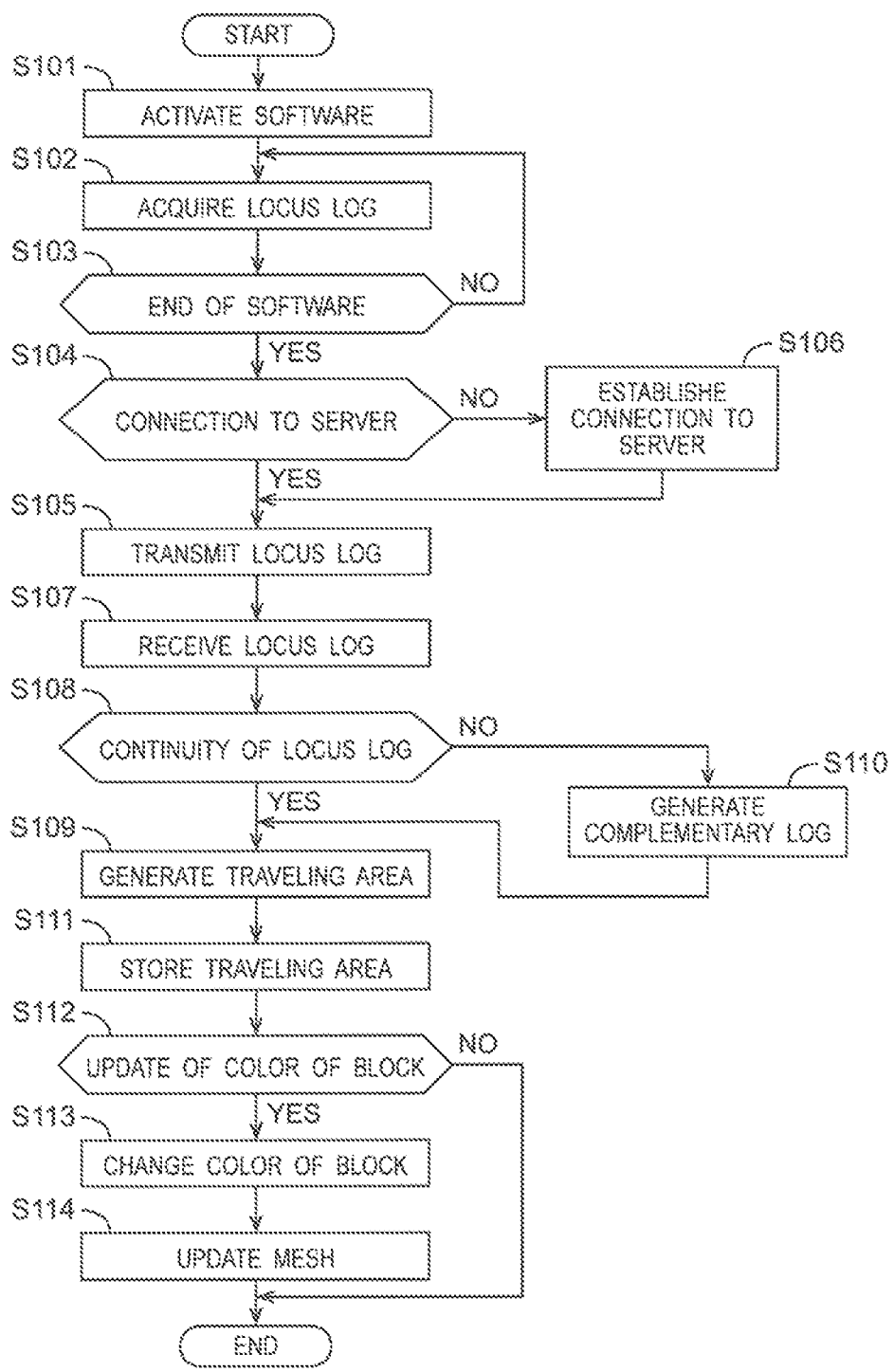
FIG. 6 is a flowchart that generates a traveling area according to the first embodiment.
Figure 7:
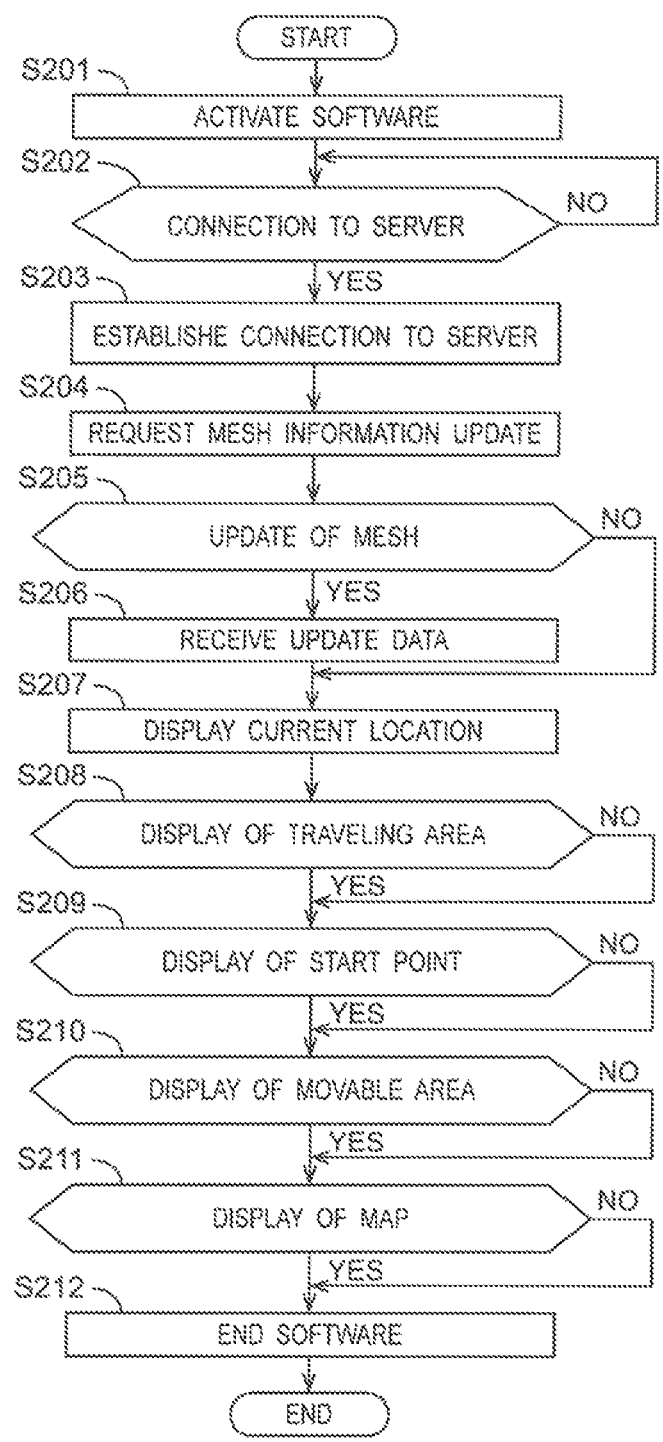
FIG. 7 is a flowchart that displays the traveling area according to the first embodiment.

The step of generating the traveling area 14c in FIG. 6 and the step of displaying the traveling area 14c in FIG. 7 may be executed individually or collectively.

The information processing device 1 of the first embodiment can display, on the display 14, the area information about the traveling area 14c, which is displayed while weighted and sorted, based on the number of overlapping points of the plurality of locus logs. Consequently, the information processing device 1 can easily set a travelable path that is not shown on the map information as the virtual path. The information processing device 1 can also display the area information about the traveling area 14c on the map information in which a terrain in FIG. 3 is illustrated by a solid line different from the block 14b.

The information processing device 1 of the first embodiment includes the storage 13 configured to store the mesh information and the map information are stored, and the acquisition unit 18 configured to acquire the mesh information from the server 2. Thus, by acquiring the mesh information from the server 2, the information processing device 1 can relatively easily display the updated information while superimposing the updated mesh information on the map information. The map and the mesh 14a are superimposed and displayed such that the longitude and latitude information included in the map information coincides with the longitude and latitude information included in the mesh information.

The information processing device 1 of the first embodiment includes the acquisition unit 18 configured to acquire the positional information about the current position of the vehicle. The additional information is weighted such that the block 14b is displayed on the display 14 with higher brightness as the number of overlapping points of the plurality of locus logs increases. The display 14 can display the plurality of pieces of positional information acquired by the acquisition unit 18 while superimposing the plurality of pieces of positional information on the plurality of blocks 14b. When displaying the plurality of pieces of positional information, the display 14 can also superimpose a line connecting the plurality of pieces of positional information on the block 14b. Thus, since the information processing device 1 displays the block 14b having the larger number of overlapping points of the plurality of locus logs on the display 14 with higher brightness, the user can more clearly recognize the positional information about the movement of the vehicle even if the positional information is displayed while superimposed on the block 14b.

According to the information processing device 1 of the first embodiment, the display 14 displays the start position at which the vehicle equipped with the in-vehicle device starts the movement and the current position of the vehicle, so that the user can easily grasp a positional relationship between the start position and the current position.

According to the information processing device 1 of the first embodiment, the user can grasp the movable range in which the vehicle can move from the current position based on the remaining information about the energy source enabling the vehicle to travel.

The information processing device 1 of the first embodiment includes the controller 11 configured to change the scale based on the longitude and latitude of the mesh 14*a* in order to display the current position and the whole movable area on the display 14. For the vehicle returning to a departure point, the whole movement area is displayed when the controller 11 expands and contracts the scale based on the longitude and latitude of the mesh 14*a*, which leads to a sense of security of a driver of the vehicle.

Since the information processing device 1 of the first embodiment outputs a warning when the start position is located outside the movable area, the information processing device 1 can assist to return the vehicle to the start position based on the remaining information about the energy source that enables the vehicle to travel. Consequently, the user can move the vehicle at ease.

According to the information processing system of the first embodiment, the user can grasp the travelable position of the longitude and latitude based on the plurality of locus logs. Consequently, according to the information processing system of the first embodiment, the user can easily set the travelable path as the virtual path.

In the information processing system of the first embodiment, the locus logs that are the generation target of the area information is set in the time-series range, and the area information is generated using the plurality of locus logs included in the time-series range, so that the information about the latest traveling area 14*c* can be obtained.

The server 2 of the first embodiment includes the server storage 22 configured to store the plurality of locus logs of the vehicle and the server controller 21 configured to generate the area information about a traveling area 14*c* where the vehicle can travel based on the plurality of locus logs recorded in the server storage 22. The locus log is a log generated by connecting the plurality of point logs. The area information is the additional information added to each of the plurality of blocks 14*b* constituting the mesh 14*a* based on the longitude and the latitude. The additional information is information weighting the block 14*b* located at the overlapping point in the locus of each of the plurality of locus logs based on the overlapping number of locus logs. As described above, in the first embodiment, the weighting is performed by the server 2. However, the present invention is not limited thereto. The weighting may be performed by the information processing device 1. At this point, the information processing device 1 may include the storage 13 configured to record the plurality of locus logs of the vehicle and the controller 11 configured to generate the area information about a traveling area 14*c* where the moving body 5 can travel based on the plurality of locus logs recorded in the storage 13. In the information processing system of the first embodiment, at least one of the server 2 and the information processing device 1 may be configured to perform the weighting. When the weighting can be performed only by the information processing device 1, the information processing system is configured by the single information processing device 1.

In the first embodiment, a vehicle is used as the moving body 5. However, the present invention is not limited to a vehicle. For example, the moving body 5 may be a person, a snowmobile, or an airplane.

Figure 10:
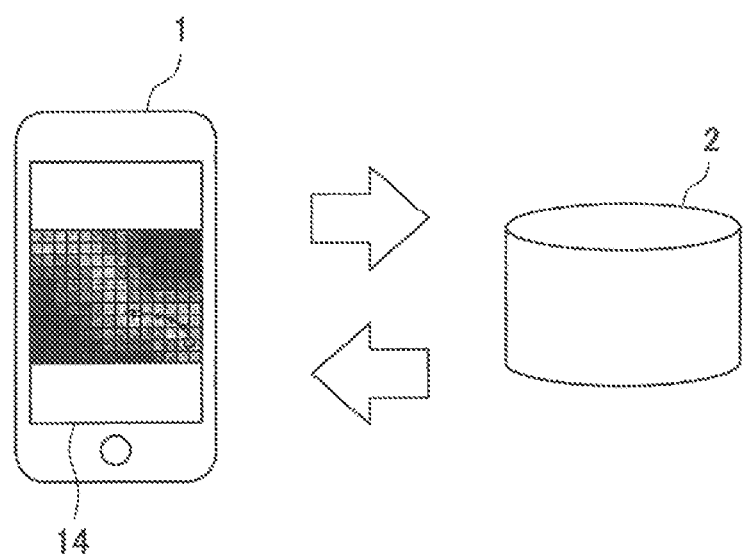
FIG. 10 is a schematic configuration diagram of an information processing system according to a second embodiment.

In the first embodiment, the in-vehicle device is used as the information processing device 1. However, the present invention is not limited thereto. Any other device that can be held by the moving body 5 may be used in addition to the in-vehicle device. For example, in the case where the moving body 5 is a person, the information processing device 1 may be an information processing terminal such as a smartphone as illustrated in FIG. 10. In this case, the information processing terminal is a terminal having the navigation function. The information processing device 1 may be an information processing terminal that is portable and detachable from the vehicle as illustrated in FIG. 10.

In the first embodiment, the information processing device 1 includes the communication unit 15 including the network communication unit 151 and the inter-device communication unit 152. However, the communication unit 15 may include only the inter-device communication unit 152.

In the first embodiment, the information processing device 1 includes the display 14 that displays the mesh 14*a* of the mesh information based on the longitude and the latitude. The mesh 14*a* is composed of the plurality of blocks. The mesh information includes the area information about the traveling area 14*c* where the moving body 5 can travel. The area information is the additional information added to each of the plurality of blocks. The additional information is the display information that is weighted and sorted, based on the number of overlapping points of the plurality of locus logs.

In the first embodiment, the information processing device 1 includes the storage 13 and the acquisition unit 18. The mesh information and the map information are stored in the storage 13. The acquisition unit 18 acquires the mesh information from the server 2.

In the first embodiment, the acquisition unit 18 of the information processing device 1 acquires the positional information about the current position of the moving body 5. The additional information is weighted such that the block is displayed on the display 14 with higher brightness as the number of overlapping points of the plurality of locus logs increases. The display 14 displays the plurality of pieces of positional information acquired by the acquisition unit 18 while superimposing the plurality of pieces of positional information on the plurality of blocks.

Consequently, the information processing device 1 can provide, to the user, the display in which the overlapping point is easily recognized in the loci of the plurality of locus logs based on the color difference of each block 14*b*.

In the first embodiment, the display 14 of the information processing device 1 displays the start position at which the moving body 5 starts the movement and the current position of the moving body 5.

Consequently, the user can easily grasp the positional relationship between the start position and the current position.

In the first embodiment, the acquisition unit 18 of the information processing device 1 acquires the remaining information about the energy source enabling the moving body 5 to travel. The display 14 displays the positional information about the current position and the movable area which is a range where the moving body 5 is movable from the current position.

Consequently, the information processing device 1 displays the area where the vehicle can travel by the remaining energy source, so that the user can move the vehicle at ease.

In the first embodiment, the information processing device 1 further includes the controller 11. The controller 11 changes the scale based on the longitude and latitude of the mesh 14a so as to display the positional information about the current position and the whole movable area on the display 14.

Consequently, the user can move the vehicle while checking the whole area where the vehicle can travel by the remaining energy source. Thus, the user can move the vehicle at ease.

In the first embodiment, the display 14 of the information processing device 1 displays the start position at which the moving body 5 starts the movement and the current position of the moving body 5, and outputs a warning when the start position is located outside the movable area.

Consequently, the information processing device 1 performs the support to return the vehicle to the start position, so that the user can move the vehicle at ease.

In the first embodiment, the program causing a computer to display the mesh of the mesh information based on the longitude and the latitude is provided. The mesh 14a is composed of the plurality of blocks. The mesh information includes the area information about the traveling area 14c where the moving body 5 can travel. The area information is the additional information added to each of the plurality of blocks. The additional information is the display information that is weighted and sorted, based on the number of overlapping points of the plurality of locus logs. A non-transitory computer-readable recording medium configured to store the program may be provided.

Therefore, a second embodiment in which the present invention is applied to the information processing device 1 including only the inter-device communication unit 152 in the communication unit 15 will be described below.

Second Embodiment

The second embodiment is different from the first embodiment in that the information processing device 1 is connected to the server 2 through an information processing terminal 3, and that the information processing device 1 does not include the network communication unit 151. Therefore, the second embodiment has operation effects and modifications similar to those of the first embodiment.

In the following second embodiment, a configuration different from that of the first embodiment will mainly be described, and the description of the same configuration will occasionally be omitted.

Figure 11:
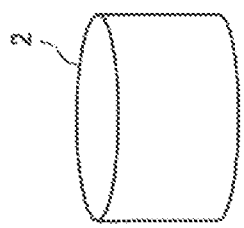
FIG. 11 is a schematic configuration diagram of the information processing system according to the second embodiment.
Figure 11:
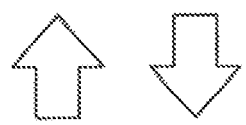
Figure 11:
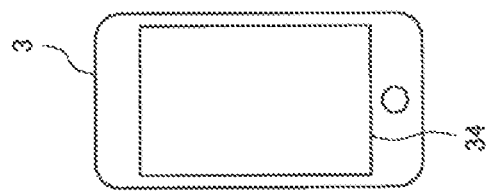
Figure 11:
Figure 11:
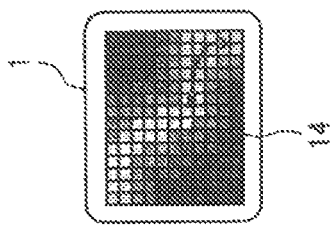

As illustrated in FIG. 11, in the second embodiment, the information processing device 1 is connected to the server 2 through the information processing terminal 3 in a wirelessly communicable manner. The information processing device 1 of the second embodiment is not directly wirelessly communicable with the server 2.

Figure 12:
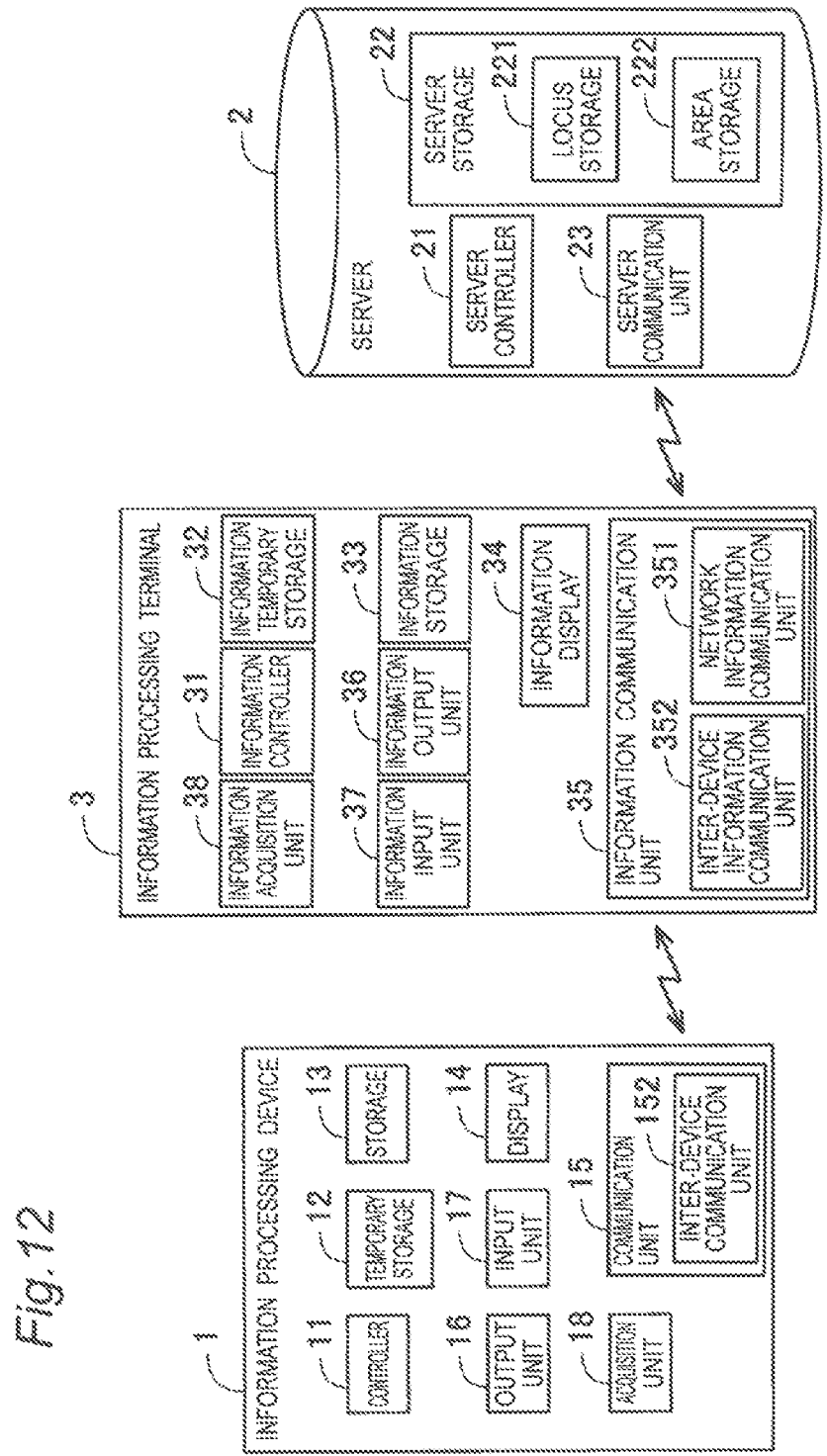
FIG. 12 is a schematic configuration block diagram of the information processing system according to the second embodiment.

As illustrated in FIG. 12, the information processing device 1 includes the controller 11, the temporary storage 12, the storage 13, the display 14, the communication unit 15, the output unit 16, the input unit 17, and the acquisition unit 18.

The communication unit 15 includes the inter-device communication unit 152 that communicably connects to another communication device to transmit and receive information. For example, another communication device is the communication unit 15 of another moving body 5 that travels in parallel. The communication unit 15 transmits and receives information based on wireless communication standards such as infrared communication, Wi-Fi (registered trademark), Bluetooth (registered trademark), BLE, and 3G or 4G mobile communication.

As illustrated in FIG. 12, the server 2 includes the server controller 21, the server storage 22, and the server communication unit 23.

The server storage 22 includes the locus storage 221 in which the plurality of locus logs of various vehicles communicable with the server 2 are recorded. The server storage 22 includes an area storage 222 in which the area information about the traveling area 14c generated based on the plurality of locus logs is stored.

As illustrated in FIGS. 11 and 12, the information processing terminal 3 serves as a relay point for network connection in order to connect the information processing device 1 and the server 2.

As illustrated in FIG. 12, the information processing terminal 3 includes an information controller 31, an information temporary storage 32, an information storage 33, an information display 34, an information communication unit 35, an information output unit 36, an information input unit 37, and an information acquisition unit 38.

The information controller 31 controls the operation based on an information processing program stored in the information storage 33. For example, the information controller 31 is configured by a CPU.

Information controlled by the information controller 31 is temporarily recorded in the information temporary storage 32. For example, the information temporary storage 32 is configured by a volatile memory such as a RAM. Information generated by the processing of the information controller 31 is temporarily stored in the information temporary storage 32.

The information storage 33 is a storage to record information processing programs and various pieces of information necessary for information processing. For example, a nonvolatile memory such as a ROM is used as the information storage 33.

The information display 34 displays the presence or absence of the network connection between the information processing device 1 and the server 2. The information display 34 is configured by a touch panel. The touch panel has an input function in which the user performs the input by touching the screen of the information display 34.

The information communication unit 35 includes a network information communication unit 351 that is connected to the server 2 in a wirelessly communicable manner to transmit and receive information. The information communication unit 35 includes an inter-device information communication unit 352 that is communicably connected to another communication device such as the information processing device 1 to transmit and receive information. The information communication unit 35 transmits information based on wireless communication standards such as infrared communication, Wi-Fi (registered trademark), Bluetooth (registered trademark), BLE, VICS (registered trademark), and 3G or 4G mobile communication.

The information output unit 36 includes the information display 34 and a sound output device other than the information display 34.

The user directly issues an instruction to the information processing terminal 3 through the information input unit 37. For example, the information input unit 37 is configured by a touch panel type input device. The information input unit 37 is configured such that the user can issue the instruction to the information processing device 1 by inputting characters or by directly touching a segment of the information display 34. The information input unit 37 may be configured such that the user can issue the instruction to the information processing device 1 in a wired or wireless manner through a physical key.

The information acquisition unit 38 acquires the positional information indicating the current position of the information processing terminal 3. The information acquisition unit 38 of the second embodiment acquires, but is not limited to, the positional information using a GPS. For example, the information acquisition unit 38 may be configured to acquire the positional information using the information communication base station.

The operation to generate the traveling area 14c based on the locus log in the information processing system will be described below with reference to FIGS. 4 and 13. In the description of the generation of the traveling area 14c, a buggy vehicle is used as an example of the moving body 5 as illustrated in FIG. 5.

The user powers on the information processing device 1 and the information processing terminal 3. The power-on and power-off of the information processing device 1 may be interlocked with power-on and power-off of the vehicle. When the information processing device 1 is powered on, the controller 11 activates the navigation software (step S301).

After the navigation software is activated, the user moves the vehicle from the start position. In FIG. 4, the start position is indicated by the mark S. While the user moves the moving body 5, the acquisition unit 18 acquires the locus log (step S302).

After the user moves the vehicle and returns the vehicle to the start position, the controller 11 ends the navigation software (step S303).

When the controller 11 ends the navigation software in step S303, the information processing device 1 checks whether the information processing device 1 is connected to the server 2 through the information processing terminal 3 (step S304).

When the information processing device 1 is connected to the server 2 through the information processing terminal 3 (YES in step S304), the information processing device 1 transmits all the pieces of log data of the locus log to the server 2 (step S305).

When the information processing device 1 is not connected to the server 2 through the information processing terminal 3 (NO in step S304), the information processing device 1 tries to establish inter-device communication connection to the information processing terminal 3 (step S306).

When the information processing device 1 establishes the inter-device communication connection to the information processing terminal 3 (YES in step S306), the information processing terminal 3 tries to establish network communication connection to the server 2 (step S307).

On the other hand, when the information processing device 1 does not establish the inter-device communication connection to the information processing terminal 3 (NO in step S306), the information processing device 1 tries to establish the inter-device communication connection to the information processing terminal 3 (step S306).

When the information processing terminal 3 establishes the network communication connection to the server 2 (YES in step S307), the information processing device 1 establishes the network communication connection to the server 2 through the information processing terminal 3 to transmit the locus log (step S305).

On the other hand, when the information processing terminal 3 does not establish the network communication connection to the server 2 (NO in step S307), the information processing terminal 3 tries to establish the network communication connection to the server 2 (step S307).

After establishing the network communication connection to the server 2 through the information processing terminal 3, the information processing device 1 transmits all the pieces of log data of the locus log (step S305).

In step S305, the information processing device 1 collectively transmits all the pieces of log data of the locus log to the server 2. However, the present invention is not limited thereto. For example, the information processing device 1 may transmit the log data to the server 2 every time the log data of the locus log is acquired in step S302. In the case where the log data is transmitted every time the log data of the locus log is acquired, the information processing device 1 may not check the connection to the server 2 in step S304.

When the information processing device 1 transmits the locus log to the server 2, the server 2 receives the locus log through the information processing terminal 3 (step S308).

Then, the server controller 21 determines whether all the pieces of data of the locus log are continuous (step S309). Specifically, the server controller 21 applies the locus log to the mesh 14a to determine whether the block 14b having no point log exists.

In step S309, when determining that the block 14b having the point log is continuous, the server controller 21 determines that all the pieces of data of the locus log is continuous, and stores the locus log in the locus storage 221 of the server storage 22.

The server controller 21 generates the area information about the traveling area 14c using the plurality of locus logs stored in the server storage 22 (step S310).

In step S310, the server controller 21 generates the area information about the traveling area 14c based on the plurality of locus logs. The area information is the additional information added to each of the plurality of blocks 14b constituting the mesh 14a based on the longitude and the latitude. The additional information is information weighting the block 14b located at the overlapping point in the locus of each of the plurality of locus logs based on the overlapping number of locus logs. In the weighting, the overlapping numbers are classified into, for example, five stages of 0 times, 5 times, 10 times, 30 times, and 100 times. The server controller 21 stores shading display information indicating shading of the block 14b in the information about the block 14b as the additional information such that the color of the block 14b is made lighter in order of the number of times based on the classified five-stage information. In the second embodiment, the addition of the shading display information about the block 14b is referred to as weighting. The server controller 21 makes the color of the block 14b lighter in the order of the number of times based on the five-stage information, so that the traveling area 14c in which the vehicle can travel can easily be recognized.

On the other hand, when determining that all the pieces of data of the locus log are not continuous in step S309, the server controller 21 generates a virtual log to complement the log such that all the pieces of data of the locus log are continuous (step S311). Hereinafter, the virtual log is referred to as a complementary log. When the acquisition unit 18 is configured using a GPS, the acquisition unit 18 acquires the positional information about the current position at predetermined time intervals. When a speed of the vehicle increases, the acquisition unit 18 may generate the block 14b that does not overlap the locus of the locus log. When determining that the speed of the vehicle is equal to or higher than a predetermined speed, and determining that all the pieces of data of the locus log are not continuous, the server controller 21 can generate the virtual log such that the blocks 14*b* adjacent to each other are continuous based on, for example, the positional information and the time information.

In step S311, when determining that the block 14*b* in which the point log exists is not continuous and determining that all the pieces of data of the locus log are not continuous, the server controller 21 stores the complementary log in the block 14*b* in which the point log does not exist. After the server storage 22 stores the complementary log, the server controller 21 generates the area information about the traveling area 14*c* based on the locus log (step S310).

In step S310, the server controller 21 stores the generated area information about the traveling area 14*c* in the area storage 222 of the server storage 22 (step S312).

Then, the server controller 21 determines whether the color of each block 14*b* constituting the mesh 14*a* is updated based on the area information about the traveling area 14*c* (step S313).

When updating of the color of the block 14*b* is necessary in step S313, the server controller 21 updates the color of the block 14*b* (step S314), updates the mesh 14*a* by updating the colors of all the blocks 14*b* (step S315), and ends the generation of the traveling area 14*c*.

When updating of the color of the block 14*b* is not necessary in step S313, the generation of the traveling area 14*c* is ended without updating the mesh 14*a*.

As described above, the server controller 21 weights the block 14*b* when generating the traveling area 14*c*. According to the weighting of the second embodiment, the server controller 21 weights each block 14*b* based on the number of overlapping points of the plurality of locus logs. The information processing device 1 can vary the display of the block 14*b* including overlapping points as illustrated in FIG. 4.

As described above, the information processing system of the second embodiment includes the information processing program implementing the storage step of recording the plurality of locus logs of the vehicle and the generation step of generating the area information about the traveling area 14*c* where the vehicle can travel based on the plurality of locus logs recorded in the storage step.

The display of the traveling area 14*c* using the locus log in the information processing system will be described below with reference to FIG. 14.

The user powers on the information processing device 1 and the information processing terminal 3. The power-on and power-off of the information processing device 1 may be interlocked with power-on and power-off of the vehicle. When the information processing device 1 is powered on, the controller 11 activates the navigation software (step S401).

After the navigation software is activated, the information processing device 1 confirms whether the information processing device 1 is connected to the server 2 through the information processing terminal 3 (step S402).

When the information processing device 1 is connected to the server 2 (YES in step S402), the information processing device 1 requests the server 2 to update the mesh information (step S403).

When the information processing device 1 is not connected to the server 2 (NO in step S402), the information processing device 1 tries to establish the inter-device communication connection to the information processing terminal 3 (step S404).

When the information processing device 1 establishes the inter-device communication connection to the information processing terminal 3 (YES in step S404), the information processing terminal 3 tries to establish the network communication connection to the server 2 (step S405).

When the information processing device 1 does not establish the inter-device communication connection to the information processing terminal 3 (NO in step S404), the information processing device 1 tries to establish the inter-device communication connection to the information processing terminal 3 (step S404).

When the information processing terminal 3 establishes the network communication connection to the server 2 (YES in step S405), the information processing device 1 establishes the network communication connection to the server 2 through the information processing terminal 3 to request the server 2 to update the mesh information (step S403).

When the information processing terminal 3 does not establish the network communication connection to the server 2 (NO in step S405), the information processing terminal 3 tries to establish the network communication connection to the server 2 (step S405).

After establishing the network communication connection to the server 2 through the information processing terminal 3, the information processing device 1 requests the server 2 to update the mesh information (step S403).

When the instruction command from the server 2 to the information processing device 1 is a command that an update mesh exists (YES in step S406), the information processing device 1 receives the update data of the mesh 14*a* from the server 2 (step S407). At this point, the information processing device 1 receives the update data in each block 14*b* in each hierarchy of the mesh 14*a*.

In step S407, the information processing device 1 updates the mesh 14*a* by updating the plurality of blocks 14*b*. After updating the mesh 14*a*, the information processing device 1 displays the updated mesh 14*a* on the display 14. At this point, the information processing device 1 displays the current position of the vehicle equipped with the information processing device 1 and the map on the display 14.

On the other hand, when the instruction command to the information processing device 1 from the server 2 is a command that the update mesh exists (NO in step S406), the information processing device 1 transitions to step S408. The information processing device 1 displays the mesh 14*a*, the current location, and the map on the display 14.

Then, the information processing device 1 displays the traveling area 14*c* (step S409).

When the area information of the traveling area 14*c* exists, the information processing device 1 displays the traveling area 14*c* on the display 14 (YES in step S409). On the other hand, when the area information about the traveling area 14*c* does not exist, the information processing device 1 does not display the traveling area 14*c* on the display 14 (NO in step S409).

Then, the information processing device 1 displays the start position (start point) (step S410).

When the information about the start point exists, the information processing device 1 displays the start point on the display 14 (YES in step S410). On the other hand, in step S410, when the information about the start point does not exist, the information processing device 1 does not display the start point on the display 14 (NO in step S410).

Then, the movable area based on the remaining amount of the energy source of the vehicle is displayed (step S411).

When the area information about the movable area exists, the information processing device 1 displays the movable area in FIGS. 8 and 9 on the display 14 (YES in step S411). On the other hand, when the information about the movable area does not exist, the information processing device 1 does not display the movable area on the display 14 (No in step S411).

Then, the information processing device 1 displays the map on the display 14 (step S412).

When the information processing device 1 has the map information, the information processing device 1 displays at least the map, the mesh 14a, and the current location on the display 14 (YES in step S412). On the other hand, when the information processing device 1 does not have the map information, the information processing device 1 displays at least the mesh 14a and the current location on the display 14 (NO in step S412).

When the movement of the vehicle is completed, the information processing device 1 ends the navigation software (step S413).

As described above, the information processing device 1 of the second embodiment has the information processing program implementing the display step of displaying the mesh 14a based on the longitude and the latitude.

Figure 13:
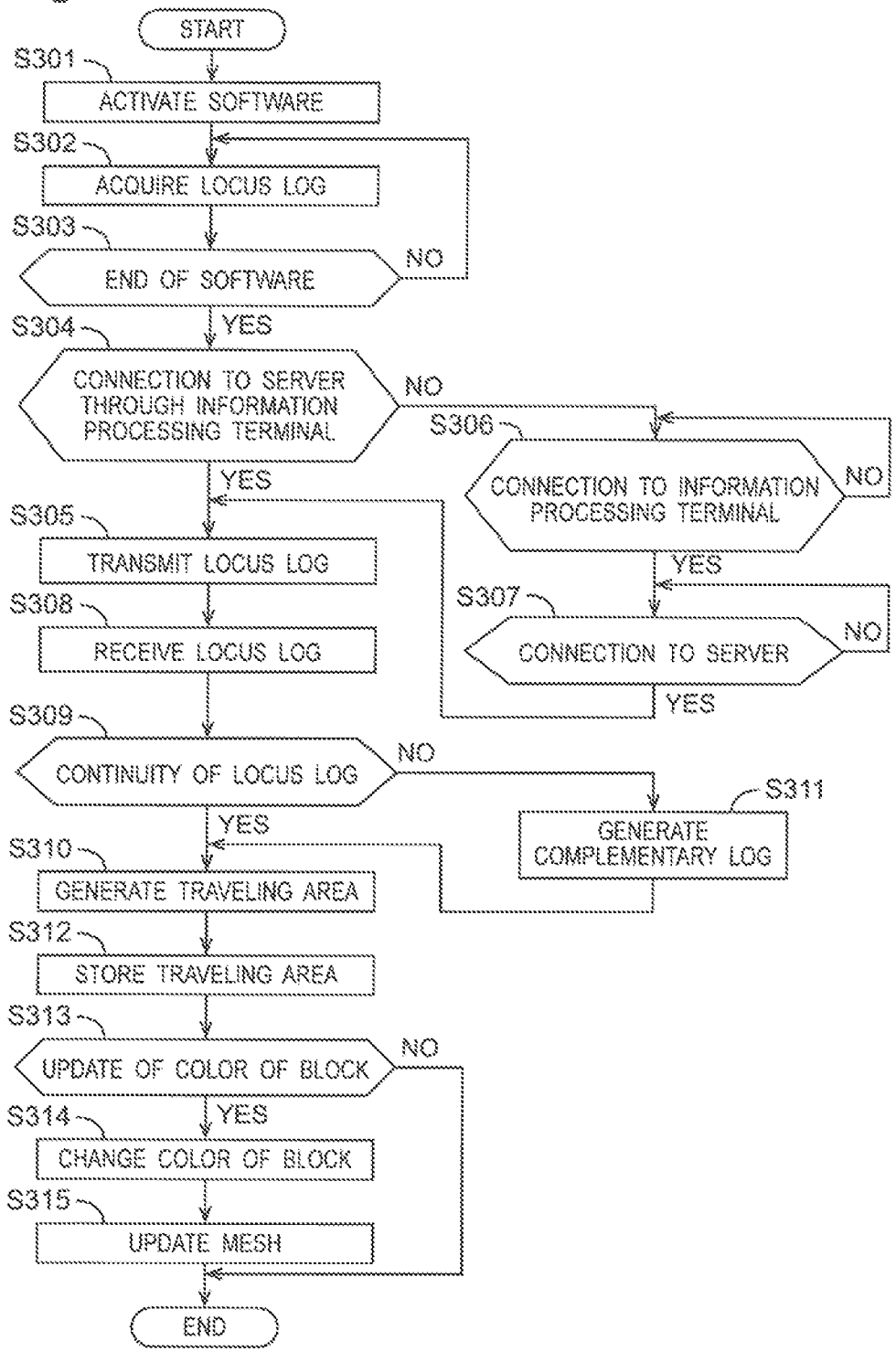
FIG. 13 is a flowchart that generates a traveling area according to the second embodiment.
Figure 14:
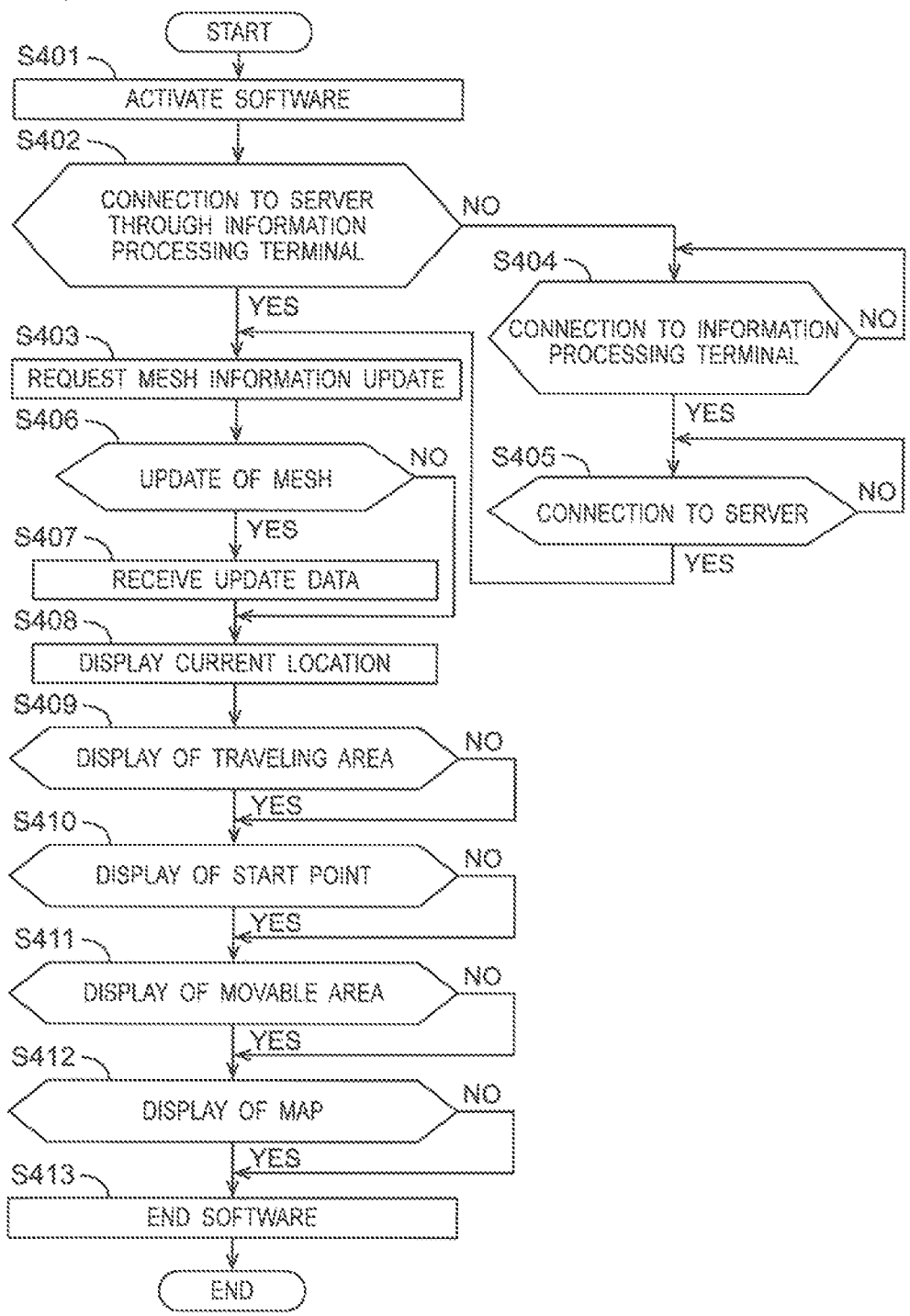
FIG. 14 is a flowchart that displays the traveling area according to the second embodiment.

The step of generating the traveling area 14c in FIG. 13 and the step of displaying the traveling area 14c in FIG. 14 may be executed individually or collectively.

As described above, according to the second embodiment, the same effects as those of the first embodiment are obtained. According to the second embodiment, using the information processing terminal 3 including the network information communication unit 351 and the inter-device information communication unit 352, the information processing system of the present invention can be constructed even if the information processing device 1 that does not include the network communication unit 151.

In the second embodiment, the information processing device 1 includes the acquisition unit 18, and the information processing terminal 3 includes the information acquisition unit 38. The acquisition unit 18 acquires the positional information about the current position of the information processing device 1. The information acquisition unit 38 acquires the positional information about the current position of the information processing terminal 3. When the user rides on the moving body 5 equipped with the information processing device 1 while possessing the information processing terminal 3, the user can select which one of the positional information about the current position acquired by the acquisition unit 18 of the information processing device 1 and the positional information about the current position acquired by the information acquisition unit 38 of the information processing terminal 3 is acquired. According to the second embodiment, the information processing system can select the positional information about the current position, so that the positional information can be acquired more accurately.

From the inventions described in the first and second embodiments, it is possible to extract the information processing system and information processing program having the following technical idea.

The information processing system includes the storage configured to record the plurality of locus logs of the moving body 5 and the controller 11 configured to generate the area information about a traveling area 14c where the moving body 5 can travel based on the plurality of locus logs recorded in the storage. The locus log is a log generated by connecting the plurality of point logs. The area information is additional information added to each of the plurality of blocks 14b constituting the mesh 14a of the mesh information based on the longitude and the latitude. The additional information is information weighting the block 14b located at the overlapping point in the locus of each of the plurality of locus logs based on the overlapping number of locus logs.

The controller 11 may generate the area information by extracting a portion during a predetermined period from the plurality of locus logs.

The information processing system has the information processing program including the storage step of recording the plurality of locus logs of the moving body 5 and the generation step of generating the area information about the traveling area 14c where the moving body 5 can travel based on the plurality of locus logs recorded in the storage step. The locus log is a log generated by connecting the plurality of point logs. The area information is additional information added to each of the plurality of blocks 14b constituting the mesh 14a of the mesh information based on the longitude and the latitude. The additional information is information weighting the block 14b located at the overlapping point in the locus of each of the plurality of locus logs based on the overlapping number of locus logs.

Third Embodiment

In the first and second embodiments, in order to display the traveling area on the map, a large processing load is sometimes applied to information processing for identifying the traveling area and causing the traveling area to coincide with the position of the map for superposition. An information processing device and a program that can reduce the processing load in information processing of displaying information indicating the traveling area where the moving body can travel will be described in the third and fourth embodiments.

In the third embodiment, an information processing system that performs guidance display of the traveling area 14c where the moving body 5 can travel will be described with reference to FIGS. 15 to 27. In the third embodiment, the traveling area 14c is a route in which the moving body 5 has traveled in the past, and can also be referred to as a recommended traveling route of the moving body 5.

Figure 15:
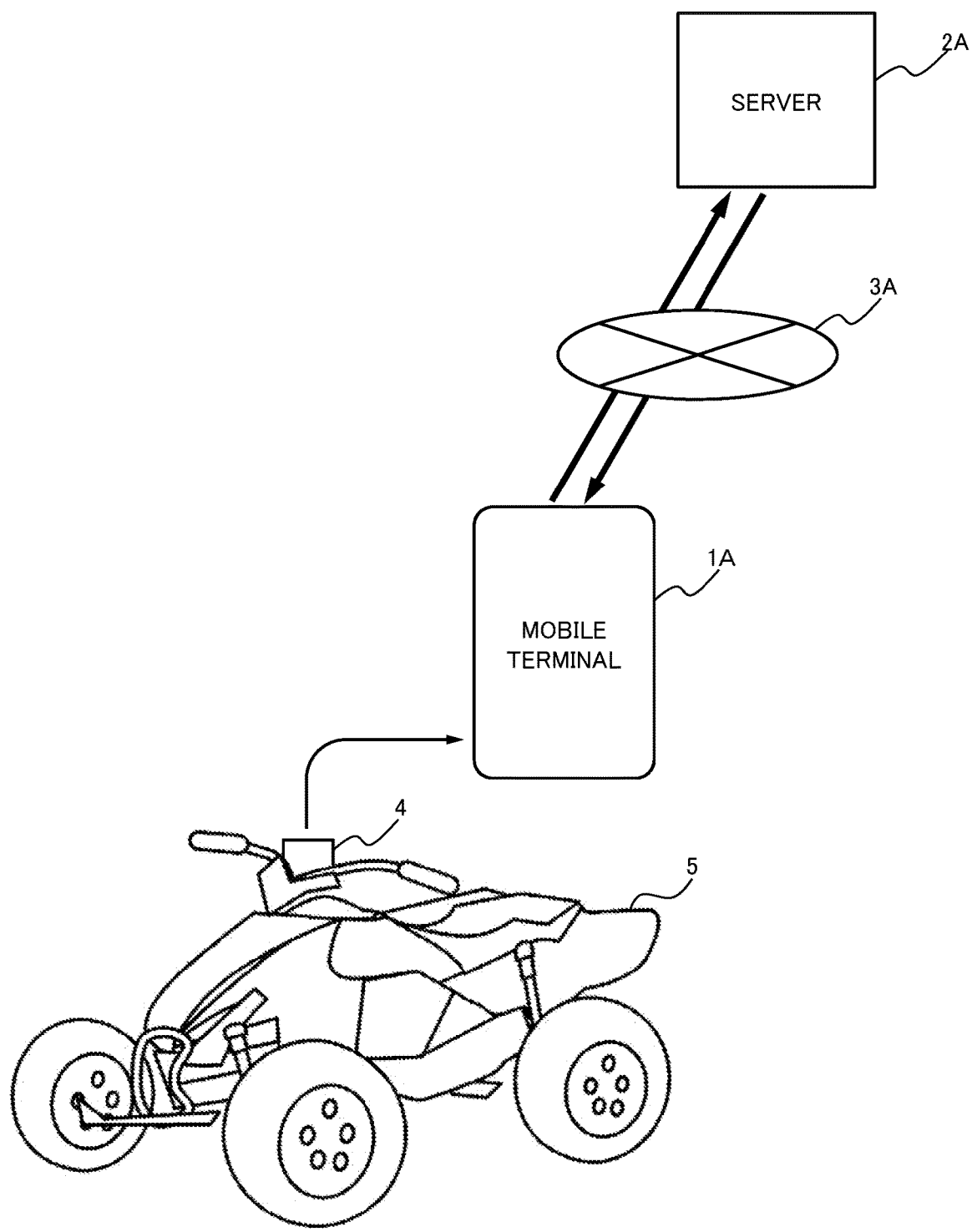
FIG. 15 is a view illustrating an information processing system according to a third embodiment.

As illustrated in FIG. 15, the information processing system of the third embodiment includes a mobile terminal 1A and a server 2A. Hereinafter, the information processing system of the third embodiment is also referred to as the system. In the system, it is assumed that a passenger of the moving body 5 possesses the mobile terminal 1A. The moving body 5 is a vehicle such as a buggy. The mobile terminal 1A is an example of the information processing device of the third embodiment. The mobile terminal 1A and the server 2A conduct information communication with each other through a network 3A such as the Internet. In FIG. 15, a flow of the information communication through the network 3A is indicated by a bold arrow. The mobile terminal 1A may be configured to be able to communicate with various devices 4 such as a navigation device in the moving body 5. In FIG. 15, a flow of the information communication between the mobile terminal 1A and the device 4 is illustrated by a thin arrow.

The system acquires the locus log of the moving body 5 and the like through the mobile terminal 1A, and accumulates the acquired information in the server 2A. The locus log is a log indicating a traveling locus of the moving body 5. By analyzing the information accumulated in the server 2A, the system generates information indicating the traveling area 14c illustrating the range where the moving body 5 has traveled, the range being considered to be travelable. The information indicating the traveling area 14c is managed by the server 2A, and can be downloaded and displayed on the mobile terminal 1A. Consequently, for example, when the moving body 5 such as a buggy travels in a natural field, such as sand dunes and mountain forests, where there are few roads used for general traffic, the guidance display of the travelable traveling area 14c can easily be provided.

Configurations of the mobile terminal 1A and the server 2A of the third embodiment will be described below.

(Mobile Terminal 1A)

Figure 16:
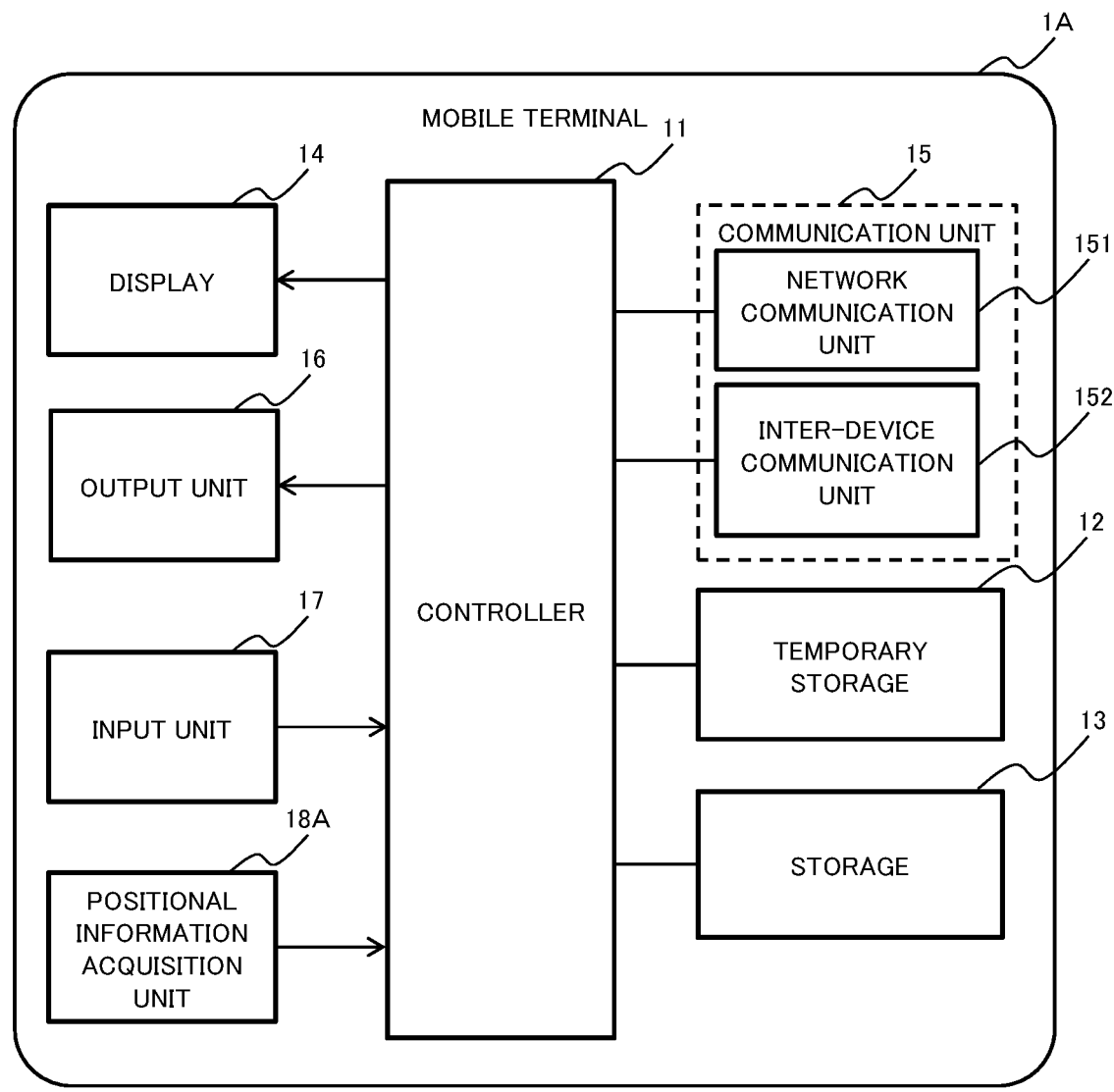
FIG. 16 is a view illustrating a configuration of a mobile terminal in the information processing system according to the third embodiment.

The configuration of the mobile terminal 1A in the information processing system will be described with reference to FIG. 16.

For example, the mobile terminal 1A is a smartphone, or may be various information processing devices such as a tablet terminal, a mobile phone, and a laptop Personal Computer (PC). As illustrated in FIG. 16, the mobile terminal 1A includes the controller 11, the temporary storage 12, the storage 13, the display 14, the communication unit 15, the output unit 16, the input unit 17, and a positional information acquisition unit 18A.

For example, the controller 11 includes a Central Processing Unit (CPU) that cooperates with software to implement a predetermined function. The controller 11 controls the operation of the mobile terminal 1A. The controller 11 reads data or a program, which is stored in the temporary storage 12 and the storage 13, and performs various pieces of calculation processing to implement a predetermined function. For example, the controller 11 creates the locus log. The controller 11 may have various functions such as a timer function. The program executed by the controller 11 may be provided from the network 3A, or stored in a recording medium having portability.

The controller 11 may be configured by a hardware circuit such as a dedicated electronic circuit designed to implement a predetermined function and a reconfigurable electronic circuit. The controller 11 may be configured by various semiconductor integrated circuits. Examples of the various semiconductor integrated circuits include a CPU, a Graphics Processing Unit (GPU), a Micro Processing Unit (MPU), a microcomputer, a Digital Signal Processor (DSP), a Field Programmable Gate Array (FPGA), and an Application Specific Integrated Circuit (ASIC).

For example, the temporary storage 12 includes a Random Access Memory (RAM), a Dynamic Random Access Memory (DRAM), or a Static Random Access Memory (SRAM). Various pieces of information that are the program and data necessary to implement the function of the mobile terminal 1A can temporarily be stored in the temporary storage 12.

The storage 13 is a storage medium to store the program and data necessary to implement the function of the mobile terminal 1A. For example, the storage 13 includes a Read Only Memory (ROM), a flash memory, or a Hard Disk Drive (HDD).

For example, the locus log, the mesh information, and the scale information are stored in the temporary storage 12 or the storage 13. The map information may be stored in the temporary storage 12 or the storage 13. For example, the map information may be obtained from the outside through the network 3A. The map information may include information, such as a map, a natural field, and a facility, which is necessary for the construction of the map. For example, the map information may include Point Of Interest (POI) information. The map information includes a geographical coordinate based on the latitude and the longitude. The geographical coordinate is an example of a position coordinate in the third embodiment. For example, the map information may be color or monochrome.

For example, the display 14 is configured by a liquid crystal display or an organic Electro Luminescence (EL) display. The display 14 displays various kinds of information such as the longitude and the latitude.

The communication unit 15 includes the network communication unit 151 and the inter-device communication unit 152. The network communication unit 151 is a module that connects the mobile terminal 1A and the network 3A according to a predetermined communication standard. Examples of the predetermined communication standard include communication standards such as Institute of Electrical and Electronic Engineers (IEEE) 802.3, IEEE 802.11a/11b/11g/11ac, VICS (registered trademark), and 3G or 4G mobile communication.

The inter-device communication unit 152 is a module that communicably connects the mobile terminal 1A and the device 4 of the moving body 5 according to a predetermined communication standard. Examples of the predetermined communication standard include communication standards such as optical wireless communication using infrared rays, Bluetooth (registered trademark), BLE (Bluetooth Low Energy), Wi-Fi (registered trademark), USB (Universal Serial Bus), HDMI, and IEEE 1395.

For example, the output unit 16 includes an audio output device. For example, the output unit 16 outputs a predetermined warning sound.

The input unit 17 is a user interface with which the user inputs various operations. In the third embodiment, the input unit 17 constitutes a touch panel together with the display 14. The input unit 17 is configured to be able to input various instruction requests by an operation to touch various segments of the display 14. The input unit 17 is not limited to the touch panel, but may be a keyboard, a button, a switch, or a combination thereof. The input unit 17 may be configured by an input device which is input in a wired or wireless manner from a physical key (not illustrated).

The positional information acquisition unit 18A acquires the positional information indicating the current position of the mobile terminal 1A. In the third embodiment, the positional information acquisition unit 18A is a GPS module configured to receive a radio wave from a GPS satellite to measure the latitude and longitude of the received point. The positional information acquisition unit 18A is not limited to a GPS module. For example, the positional information acquisition unit 18A may be configured to estimate the position from a gyro sensor, an acceleration sensor, and the propulsion of the moving body 5. The positional information acquisition unit 18A may be configured to acquire the positional information using the information communication base station. The positional information acquisition unit 18A may be configured to measure altitude of the received point in addition to the latitude and longitude of the received point.

(Server 2A)

The configuration of the server 2A in the information processing system will be described with reference to FIG. 17.

Figure 17:
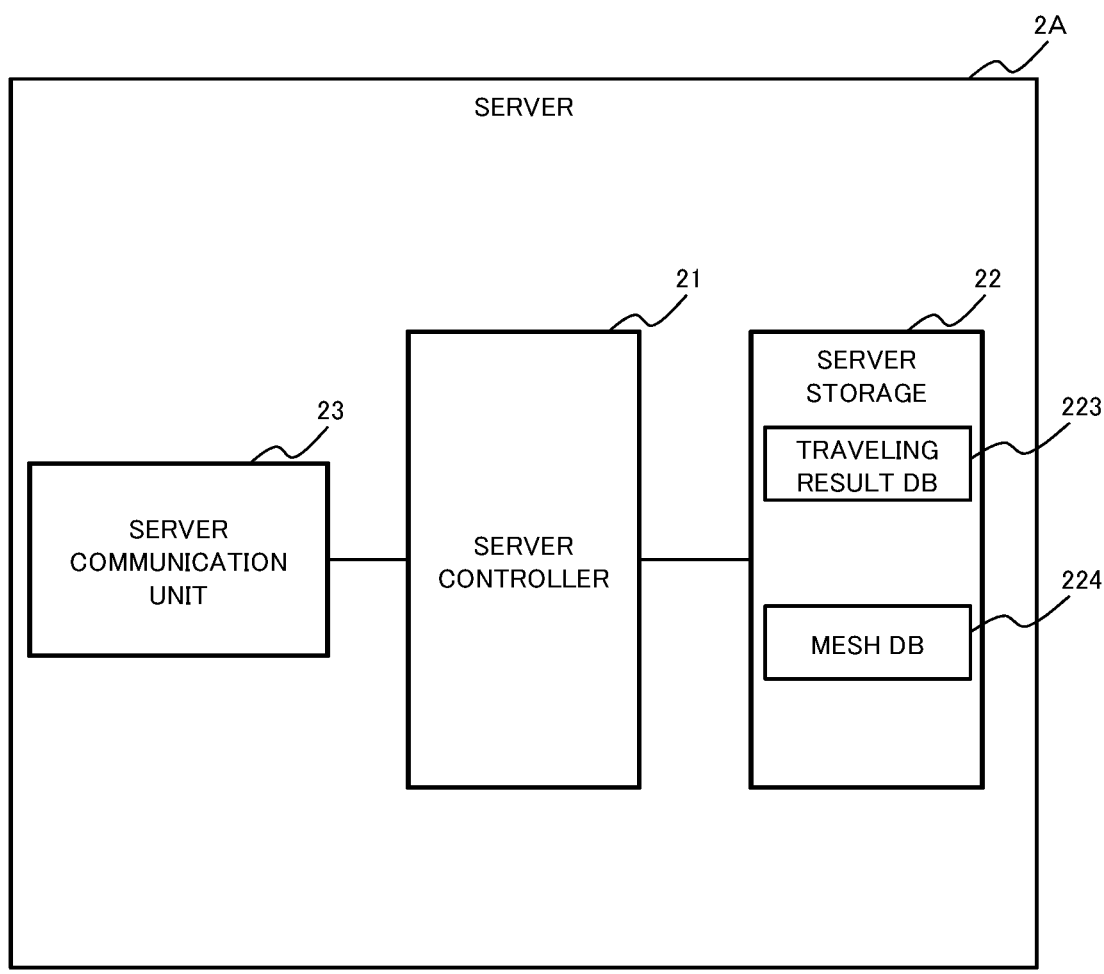
FIG. 17 is a view illustrating a configuration of a server in the information processing system according to the third embodiment.

As illustrated in FIG. 17, the server 2A includes the server controller 21, the server storage 22, and the server communication unit 23.

For example, the server controller 21 is configured to include a CPU that cooperates with software to implement a predetermined function. The server controller 21 controls the operation of the server 2A. The server controller 21 reads data or a program, which is stored in the server storage 22, and performs various pieces of calculation processing to implement a predetermined function. The server controller 21 may have various functions such as a timer function. The program executed by the server controller 21 may be provided from, for example, the network 3A, or stored in a recording medium having portability.

The server controller 21 may be configured by a hardware circuit such as a dedicated electronic circuit designed to implement a predetermined function and a reconfigurable electronic circuit. The server controller 21 may be configured by various semiconductor integrated circuits such as the CPU, the GPU, the MPU, the microcomputer, the DSP, the FPGA, and the ASIC.

The server storage 22 is a storage medium to store the program and data necessary to implement the function of the server 2A. For example, the server storage 22 is configured to include a Hard Disk Drive (HDD) or a Solid State Drive (SSD). For example, the server storage 22 may be configured to include a DRAM or an SRAM. For example, the server storage 22 may be configured to serve as a work area of the server controller 21.

For example, a traveling result database 223 and a mesh database 224 are stored in the server storage 22. Hereinafter, the database may occasionally be abbreviated as "DB".

The server communication unit 23 is a communication interface that conducts communication according to a predetermined communication standard, and establishes communication connection between the server 2A and the network 3A or external devices. Examples of the predetermined communication standard include communication standards such as IEEE802.3, IEEE802.11a/11b/11g/11ac, VICS (registered trademark), and 3G or 4G mobile communication.

Although an example of the configuration of the server 2A has been described above, the server 2A is not limited to this example and may have various configurations. For example, the server 2A may be an Application Server Provider (ASP) server, and may execute various pieces of processing in cloud computing.

Various databases in the information processing system of the third embodiment will be described below with reference to FIGS. 18A, 18B, 19A, and 19B.

Figure 19A:
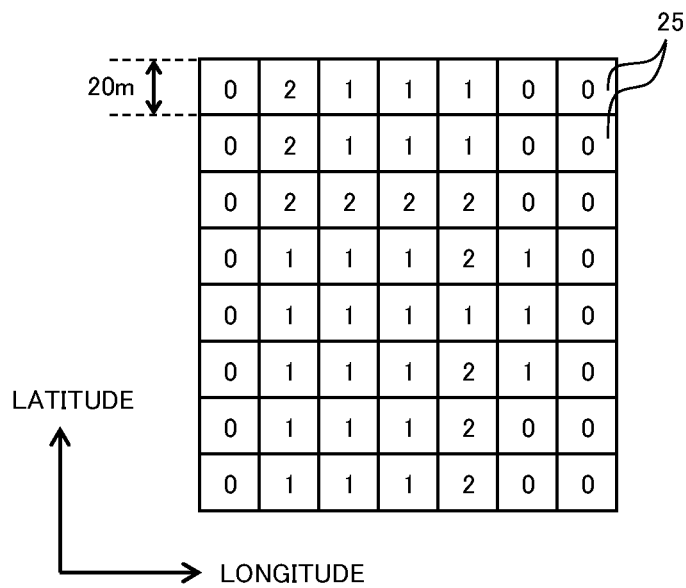
FIG. 19A is a view illustrating a mesh database in the information processing system according to the third embodiment.
Figure 19B:
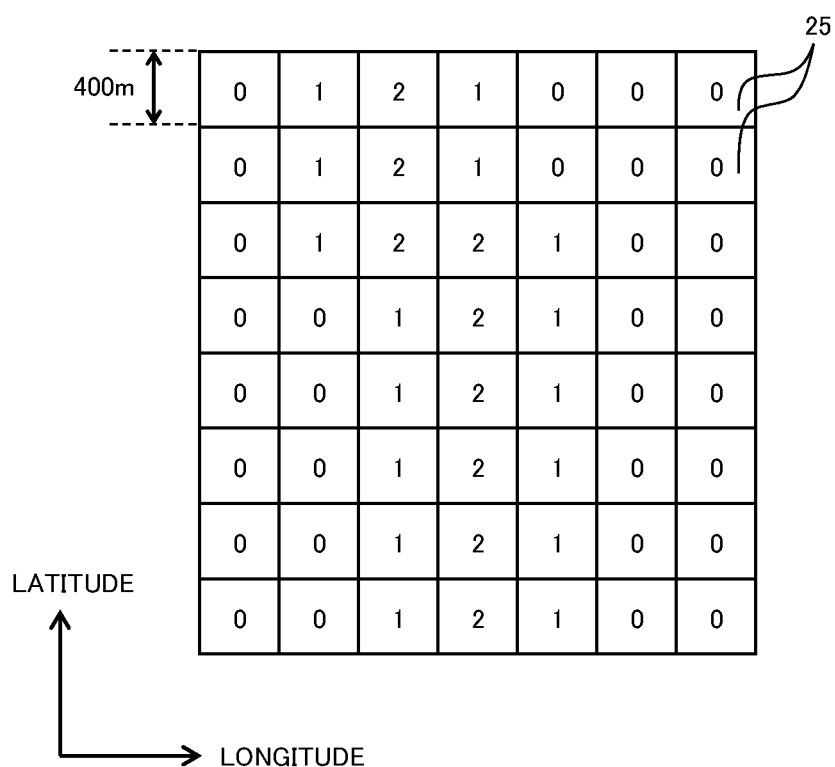
FIG. 19B is a view illustrating the mesh database in the information processing system according to the third embodiment.

FIG. 18A illustrates an example of the traveling result DB 223. FIG. 18B illustrates an example of the locus log managed by the traveling result DB 223. FIG. 19A illustrates an example of a mesh DB 224a of a first scale in the mesh DB 224. FIG. 19B illustrates an example of a mesh DB 224b of a second scale in the mesh DB 224.

In the example of FIG. 18A, a "management number," a "date," and a "departure time" are recorded in the traveling result DB 223 while correlated with one another. The "management number" indicates a number for managing the locus log. A date when the locus log is obtained is set to the "date". For example, the "departure time" represents a start time of recording of the locus log.

In the example of FIGS. 18A and 18B, the server 2A manages the locus log accumulated in the server storage 22 in correlation with the traveling result DB 223 by the management number. As illustrated in FIG. 18B, in the locus log, the "time," the "latitude," and the "longitude" are recorded while correlated with one another.

The mesh DB 224 is a database to record mesh information about the traveling area 14c of the moving body 5. The mesh information is defined while correlated with a spatial region divided into meshes on a geographical coordinate based on the latitude and the longitude. Hereinafter, information corresponding to one spatial region in the mesh information is referred to as a "block." In the third embodiment, each block 14b corresponds to a rectangular spatial region as illustrated in FIGS. 19A and 19B.

The mesh information is managed while the latitude and longitude at four corners of the spatial region corresponding to each block 14b are correlated with a predetermined value. The predetermined value is a value relating to the traveling area 14c. For example, the predetermined value is a passing frequency at which the moving body 5 passes through the spatial region corresponding to each block 14b. The mesh information is not limited to the latitude and longitude at the four corners of each block 14b. For example, the latitude and longitude at one point of the four corners or the latitude and longitude at a center point in each block 14b may be used as the mesh information.

In the third embodiment, the mesh DBs 224 having a plurality of scales are constructed so as to manage the passing frequencies of the spatial regions having different scales. FIG. 19A and FIG. 19B illustrate the mesh DBs 224 having two scales. FIG. 19A illustrates the mesh DB 224a of the first scale, and FIG. 19B illustrates the mesh DB 224b of the second scale different from the first scale. In the example of FIG. 19A, each block 14b of the mesh DB 224a of the first scale corresponds to the spatial region of 20 m by 20 m. In the example of FIG. 19B, each block 14b of the mesh DB 224b of the second scale corresponds to the spatial region of 400 m by 400 m.

For example, the mesh DB 224a of the first scale may be configured to correspond to one block 14b in the mesh DB 224b of the second scale. Each block 14b in the mesh DB 224a of the first scale exemplifies the number of times at which the moving body 5 travels. When the numerical value in the block 14b is "0", it indicates that the moving body 5 does not pass through the block 14b. When the numerical value in the block 14b is "1", it indicates that the moving body 5 passes through the block 14b once. When the numerical value in the block 14b is "2", it indicates that the moving body 5 passes through the block 14b twice. In the third embodiment, the numerical value in the block 14b is the number of times at which the moving body 5 passes, and even if a plurality of consecutive locus logs exist in one block 14b, it is displayed as one time.

Each of the mesh DB 224a and the mesh DB 224b may further be hierarchized. In the mesh DB 224a and the mesh DB 224b, the size of the spatial region is not limited to the examples in FIGS. 19A and 19B, but may be set as appropriate. The number of scales is not limited to two, but the mesh DBs 224 having at least three scales may be constructed.

(Mesh Information Update Processing)

In the information processing system of the third embodiment, the server 2A generates or updates the mesh information such that the mesh information represents the traveling area 14c where the moving body 5 can travel based on the locus log collected from various mobile terminals 1A and the like. An example of processing of updating the mesh information will be described with reference to FIGS. 20 and 21A to 21D.

Figure 20:
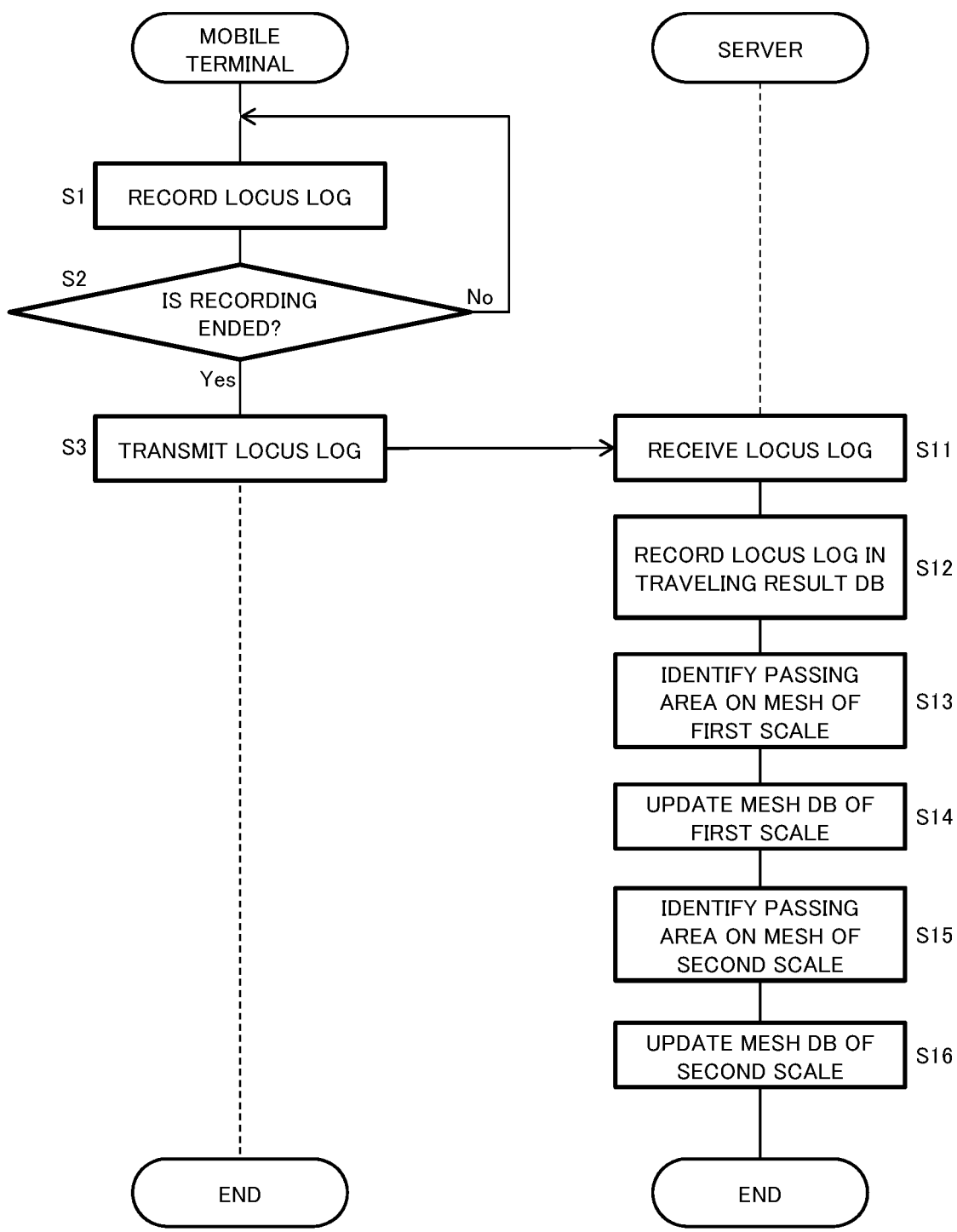
FIG. 20 is a sequence diagram illustrating mesh information update processing in the information processing system according to the third embodiment.

FIG. 20 is a sequence diagram illustrating the mesh information update processing in the information processing system. In this specification, the step may be expressed as "S" as illustrated in FIG. 20. FIG. 20 illustrates an example of the update processing of updating the mesh information in uploading the locus log from the mobile terminal 1A to the server 2A.

For example, the processing illustrated in FIG. 20 is started when predetermined application software is activated in the mobile terminal 1A while the moving body 5 is traveling.

First, the mobile terminal 1A records the locus log (step S1). For example, in the mobile terminal 1A, the positional information acquisition unit 18A receives the GPS information at predetermined time intervals, and outputs the positional information and the time information indicated by the GPS information to the controller 11. For example, the positional information is the latitude and the longitude. For example, the predetermined time interval is one second. The mobile terminal 1A can acquire the locus log using the GPS information.

For example, the controller 11 repeats the recording of the locus log until the user inputs an end operation (step S2). The controller 11 sequentially records the time, the latitude, and the longitude in the temporary storage 12 or the like as the locus log while correlating the time, the latitude, and the longitude with one another. For example, the recording of the locus log is repeated until the user inputs the end operation.

Then, the mobile terminal 1A transmits the locus log to the server 2A through the network communication unit 151 (step S3). The mobile terminal 1A establishes the communication connection with the server 2A through the network communication unit 151. In the mobile terminal 1A, all the records of the locus log are transmitted to the server 2A from the time at which the application software stored in the temporary storage 12 is activated until the user inputs the end operation. The mobile terminal 1A is not limited to the configuration in which the locus logs are collectively transmitted at once. The mobile terminal 1A may transmit the locus log at predetermined time intervals.

The server 2A receives the locus log transmitted by the mobile terminal 1A (step S11).

Then, the server 2A records the received locus log in the server storage 22 in the traveling result DB 223 (step S12). The server 2A manages the locus log in each management number in the traveling result DB 223.

Figure 21A:
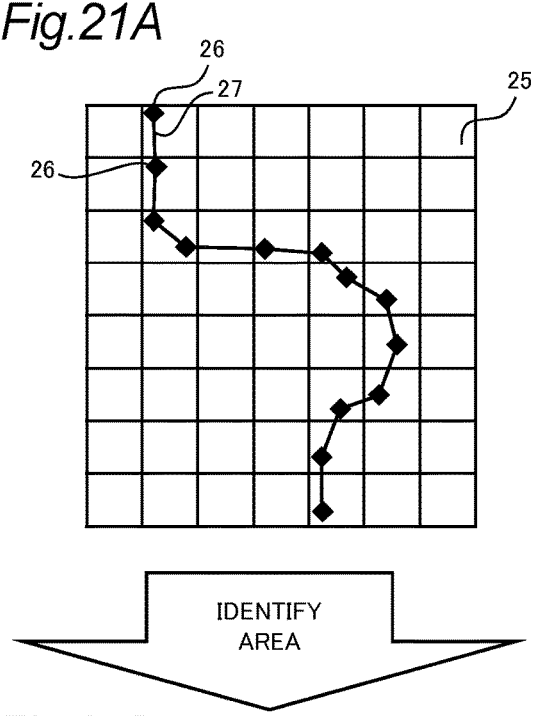
FIG. 21A is a view illustrating the mesh information update processing in the information processing system according to the third embodiment.
Figure 21B:
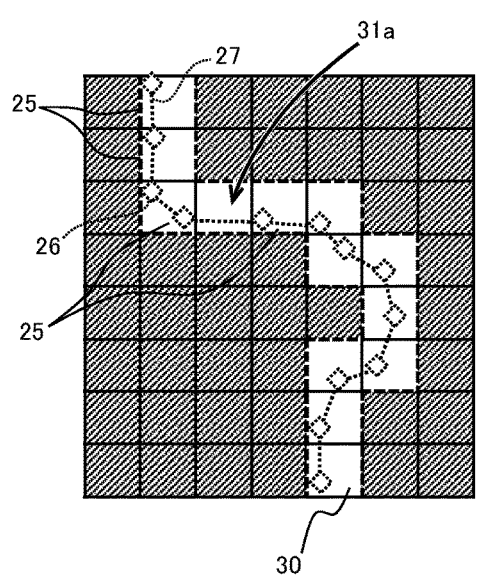
FIG. 21B is a view illustrating the mesh information update processing in the information processing system according to the third embodiment.

Then, based on the recorded locus log, the server 2A identifies a passing area 30 on the mesh of the first scale as illustrated in FIGS. 21A and 21B (step S13). The passing area 30 indicates an area through which the locus log passed on the mesh in units of blocks 14b. The processing in step S12 will be described with reference to FIGS. 21A and 21B.

FIG. 21A illustrates a locus point 26 of the locus log plotted on the mesh of the first scale. The locus point 26 of the locus log is illustrated in a black painted rhombic shape in FIG. 21A, and illustrated in an outlined rhombic shape in FIG. 21B. The locus point 26 of the locus log is located in one of the blocks 14b in the mesh of the first scale. The server controller 21 of the server 2A refers to the mesh information to calculate a line segment 27 between two points arranged in time-series order at the locus point 26 of the locus log.

FIG. 21B illustrates the passing area 30 corresponding to the locus log in FIG. 21A. As illustrated in FIG. 21B, the server controller 21 identifies a set of blocks 14b through which the calculated line segment 27 passes as the passing area 30. Consequently, even if a discontinuous portion exists between the blocks 14b where the locus point 26 of the locus log is located on the mesh, interpolation is performed in the passing area 30 like an interpolation portion 31a in FIG. 21B.

Then, the server 2A updates the mesh DB 224a of the first scale based on the identified passing area 30 (step S14). The processing in step S13 will be described below with reference to FIGS. 21C and 21D.

Figure 21C:
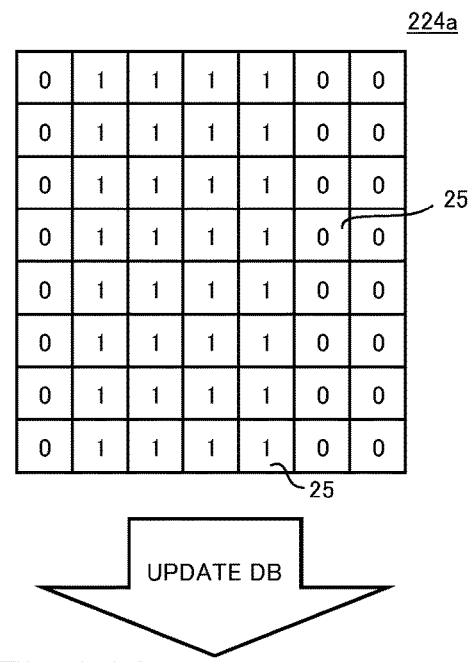
FIG. 21C is a view illustrating the mesh information update processing in the information processing system according to the third embodiment.
Figure 21D:
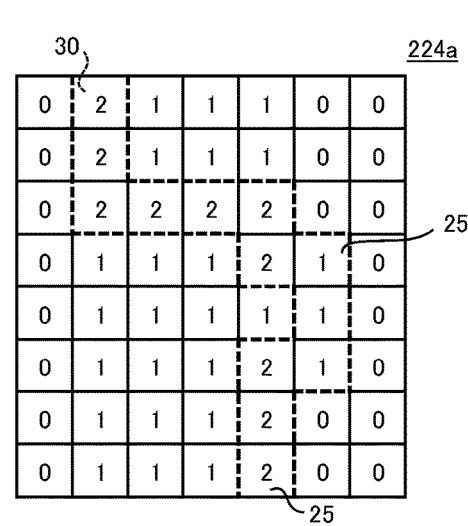
FIG. 21D is a view illustrating the mesh information update processing in the information processing system according to the third embodiment.

FIG. 21C illustrates the mesh DB 224a of the first scale before the update is performed in step S13, and FIG. 21D illustrates the mesh DB 224a of the first scale after the update is performed in step S13. The server controller 21 increments the passing frequency correlated with each block 14b in the identified passing area 30 in the mesh DB 224a of the first scale.

For example, based on the passing area 30 in FIG. 21B, the traveling area DB in the state of FIG. 21C is updated as illustrated in FIG. 21D. In FIG. 21D, a region indicated by a broken line indicates a region where the passing frequency is incremented. At a point where the passing frequency is "0" in FIG. 21C, the passing frequency is incremented and becomes "1" in FIG. 21D. At a point where the passing frequency is "1" in FIG. 21C, the passing frequency is incremented and becomes "2" in FIG. 21D.

Referring to FIG. 20, the server 2A performs the same processing as that in steps S13, S14 in the mesh DB 224b of the second scale instead of the mesh DB 224a of the first scale (steps S15, S16).

The server 2A updates the various mesh DBs 224, and ends the mesh information update processing in FIG. 20.

According to the above processing, the mesh information can appropriately be managed based on the locus log uploaded from the mobile terminal 1A.

The example in which the corresponding mesh information is updated when the locus log is uploaded is described above. The mesh information update processing is not limited to the example, but the accumulated locus logs may collectively be updated, for example, at predetermined intervals. For example, the predetermined period may be every other day.

In the server 2A, the locus log that is a target of the mesh information may be limited to a predetermined time range. For example, the server controller 21 may decrement the passing frequency so as to delete the traveling result of the mesh DB 224 of the past locus log for at least a predetermined period or more in the locus log accumulated in the traveling result DB 223. The server controller 21 may classify the locus log in each time range, and manage the mesh information in each classification. The time range of the management target may be set in each predetermined date, for example, like a summer season, or set in each of predetermined time zones of early morning, daytime, and midnight.

The server 2A may manage the mesh information by classifying the mesh information into each type of the moving body 5. As for the mesh information, the passing frequency of each moving body 5 may be managed according to a type of an All Terrain Vehicle (ATV) like, for example, a three-wheel ATV, a four-wheel ATV, and a six-wheel ATV.

(Traveling Area Display Processing)

In the information processing system of the third embodiment, the mobile terminal 1A acquires the mesh information from the server 2A, and displays the traveling area 14c indicated by the mesh information. Processing of displaying the traveling area 14c will be described with reference to FIGS. 22 and 23.

Figure 22:
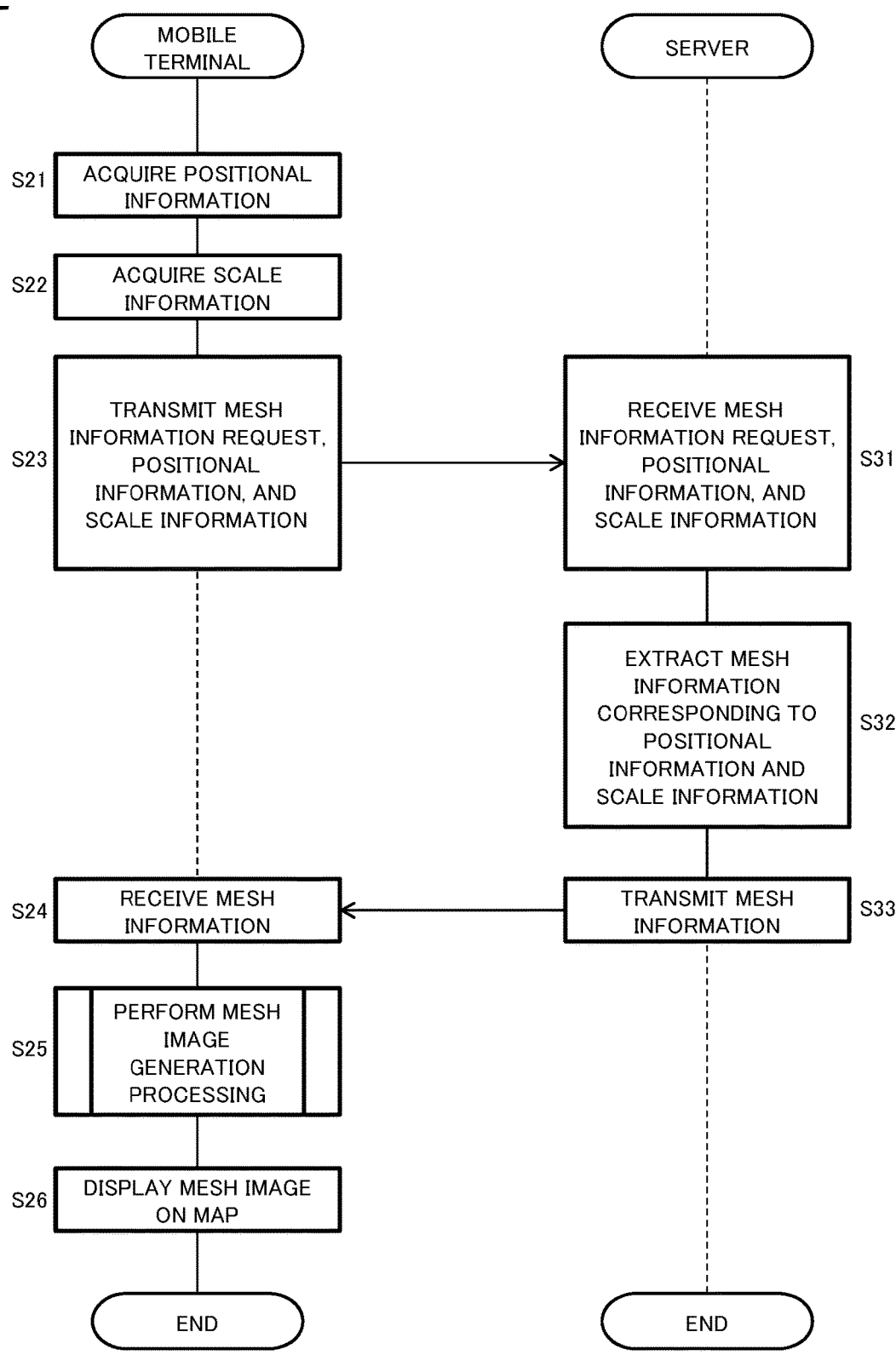
FIG. 22 is a sequence diagram illustrating traveling area display processing in the information processing system according to the third embodiment.

FIG. 22 is a sequence diagram illustrating the processing of displaying the traveling area 14c in the third embodiment. For example, the processing in FIG. 22 is started when a predetermined program is started up in the mobile terminal 1A or when a predetermined user operation is input.

First, the controller 11 of the mobile terminal 1A acquires the positional information about the current position using the positional information acquisition unit 18A (step S21). For example, the controller 11 acquires the scale information from the storage 13 (step S22). The scale information indicates a scale value of the map information on the display screen. For example, the scale value is set by a user's operation, and previously stored in the storage 13. The order of executing steps S21, S22 is not particularly limited.

Then, the controller 11 transmits a mesh information request to the server 2A through the network communication unit 151 (step S23). At this point, the controller 11 transmits the acquired positional information and scale information to the server 2A together with the mesh information request. For example, the mesh information request of the mobile terminal 1A includes identification information about the mobile terminal 1A.

The server 2A receives the mesh information request, the positional information, and the scale information from the mobile terminal 1A (step S31).

Then, the server 2A extracts the mesh information corresponding to the received positional information and scale information from the mesh DB 224 based on the received various pieces of information (step S32). For example, in the case where the scale value indicated by the scale information is equal to or larger than a predetermined value, the server 2A selects the mesh DB 224a of the first scale. On the other hand, in the case where the scale value is less than the predetermined value, the server 2A selects the mesh DB 224b of the second scale. The predetermined value is appropriately set in consideration of resolution and visibility, for example, in the case where the block 14b of the first scale is displayed based on the scale value.

The server 2A extracts the mesh information from the mesh DB of the selected scale, out of the mesh DB 224a of the first scale and the mesh DB 224b of the second scale, such that mesh information includes the mesh of a predetermined range including the position indicated by the positional information. For example, the predetermined range is a range of 30 km by 30 km centered on the position indicated by the positional information.

Then, the server 2A transmits the extracted mesh information to the mobile terminal 1A (step S33). At this point, the server 2A can refer to the received identification information in the received request to transmit the information to the mobile terminal 1A that transmits the request.

The controller 11 of the mobile terminal 1A receives the mesh information from the server 2A through the network communication unit 151 (step S24).

Then, the controller 11 performs mesh image generation processing based on the received mesh information (step S25). The mesh image generation processing is processing of generating a mesh image 41 in FIG. 23 by performing the drawing based on the mesh information. In the mesh image 41, the traveling area 14c of the moving body 5 is displayed. Details of the mesh image generation processing will be described later.

Figure 23:
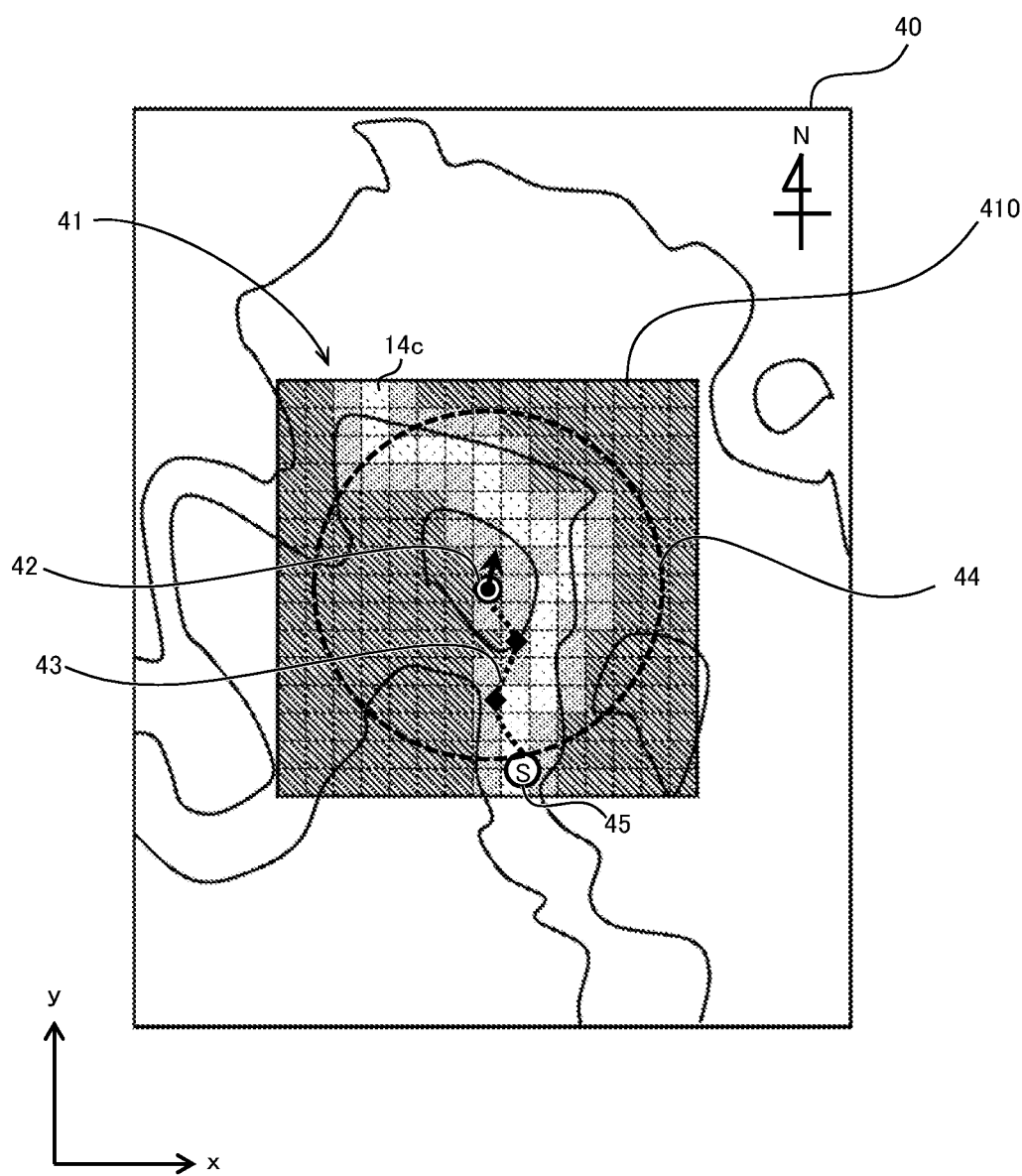
FIG. 23 is a view illustrating a display example of a mesh image in the information processing device according to the third embodiment.

Then, the controller 11 displays the generated mesh image 41 on the map as the traveling area 14c (step S26). The controller 11 generates the map image 40 based on, for example, the information indicating the map stored in the storage 13. As illustrated in FIG. 23, the controller 11 superimposes the layer of the map image 40 on the layer of the mesh image 41 such that the latitude and the longitude of the map image 40 coincide with those of the mesh image 41, and causes the display 14 to display the superimposed image. The controller 11 may further superimpose and display the layers including other various images.

After the mobile terminal 1A displays the traveling area 14c (step S26), the processing in FIG. 22 is ended. For example, when the user inputs the end operation, the processing of displaying the traveling area 14c is ended.

According to the above processing, the mesh image 41 can be displayed such that the mobile terminal 1A displays the traveling area 14c based on the mesh information managed by the server 2A of the information processing system (step S26). The display example of step S26 will be described with reference to FIG. 23.

In FIG. 23, "x" represents a coordinate in a width direction on the display screen of the display 14. In FIG. 23, "y" represents a coordinate in a height direction on the display screen. FIG. 23 illustrates the display example in which the map image 40 is displayed in an orientation in which the latitude and the y coordinate correspond to each other while the longitude and the x coordinate correspond to each other.

In step S26, for example, as illustrated in FIG. 23, the controller 11 of the mobile terminal 1A displays the mesh image 41, a current location icon 42, a locus image 43, and a movable area image 44 on the map image 40 in the display screen of the display 14. In FIG. 23, the movable area image 44 is indicated by a broken line circle.

The current location icon 42 is an icon indicating the current location of the moving body 5. The locus image 43 is an image showing a locus passing from the departure point of the moving body 5. A departure point icon 45 indicating the departure point of the moving body 5 is illustrated in FIG. 23. For example, the controller 11 can perform display control so as to obtain the positional information at predetermined time intervals to move the current location icon 42 in real time or to update the locus image 43. The controller 11 performs display control such that the current position of the moving body 5 is displayed in the central portion of the map image 40 on the display 14.

The movable area image 44 is an image showing a movable range, taking into consideration the remaining amount of fuel held by the moving body 5. The controller 11 calculates the distance in which the moving body 5 can move by obtaining information such as the remaining amount of fuel and fuel consumption of the moving body 5 from the device 4 mounted on the moving body 5 through, for example, the inter-device communication unit 152. The controller 11 can generate the movable area image 44 based on a distance calculation result and the current location. The display of the current location icon 42, the locus image 43, and the movable area image 44 may be omitted as appropriate by the user operation or the like.

In the mesh image 41, it is preferable that the block 14b having the larger passing frequency is preferably displayed in a color having higher brightness. At this point, the brightness may include transparency. Thus, in the case where the mesh image 41 is displayed as a layer drawn on the map image 40, the coloring of the map image 40 may be displayed as the transparency increases. In the case where the coloring of the map image 40 is displayed as the transparency increases, for example, the information processing device may perform the display such that the transparency decreases as the traveling frequency of the moving body 5 increases.

Details of the mesh image generation processing of the third embodiment will be described below.

(Mesh Image Generation Processing)

The mesh image generation processing in step S25 of FIG. 22 will be described with reference to FIGS. 24 and 25A to 25C. An example in which the orientation of the map image 40 on the display 14 is similar to that in FIG. 23 will be described below.

Based on the mesh information acquired from the server 2A in step S24 of FIG. 22, the controller 11 selects one block 14b as a processing target in the plurality of blocks 14b in the mesh information (step S41). In steps S41 to S52, the controller 11 performs a processing of designating a way to perform the drawing in each block 14b included in the mesh information.

Figure 25A:
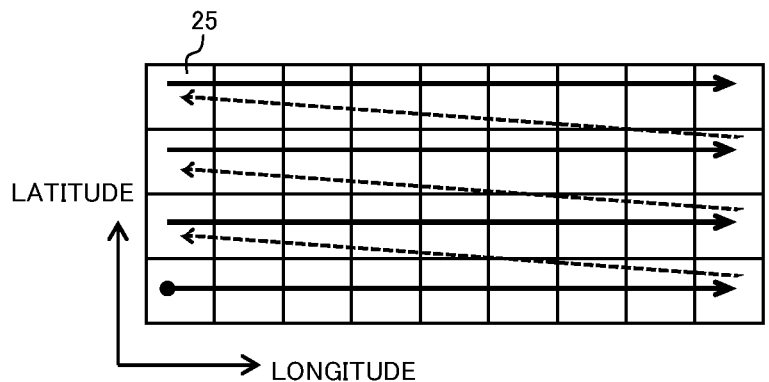
FIG. 25A is a view illustrating the mesh image generation processing in the information processing device according to the third embodiment.

FIG. 25A illustrates an example of a selection order of the block 14b in step S41. FIG. 25A illustrates an example in which the block 14b of the processing target is sequentially selected in a raster scan manner from the lower left to the upper right in the geographical coordinate of the latitude and the longitude. In the example of FIG. 25A, the selection of the block 14b is started from the left end of the lowest row in the plurality of blocks 14b arranged into a matrix shape in the mesh information. Based on the mesh information, the controller 11 sequentially selects the block 14b from the block 14b having the small latitude and longitude (step S41). The selection of the block 14b progresses sequentially from the left end to the right adjacent block 14b in each row, and is scanned so as to proceed to the next row when the selection reaches the right end of each row. In FIG. 25A, the order of selection of the block 14b in each row is illustrated by a solid line arrow, and the selection to the block 14b in the different row is illustrated by a broken line arrow.

Figure 25B:
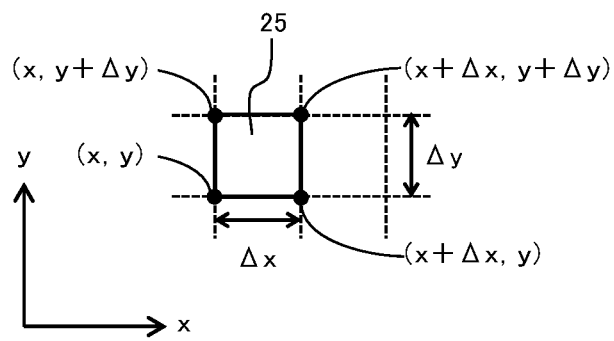
FIG. 25B is a view illustrating the mesh image generation processing in the information processing device according to the third embodiment.

Then, the controller 11 calculates the display position of the selected block 14b on the display screen of the display 14 (step S42). FIG. 25B illustrates an example of the display position of the block 14b. As illustrated in FIG. 25B, the controller 11 calculates four points (x, y), (x+$\Delta$x, y), (x, y+$\Delta$y), (x+$\Delta$x, y+$\Delta$y) corresponding to the four corners of the block 14b in the screen coordinate. Details of the processing in step S42 will be described later.

Then, based on the calculated display position of the block 14b, the controller 11 determines whether the currently-processed block 14b falls within a range of a mesh display region 410 in FIG. 23 (step S43). The mesh display region 410 is a region having a predetermined range set for displaying the mesh image 41 on the display screen. For example, the mesh display region 410 is set to the range corresponding to 5 km by 5 km centered on the current location indicated by the current location icon 42. For example, the determination in step S43 is made based on whether the four points corresponding to the four corners of the block 14b fall within the range of the mesh display region 410.

When determining that the currently-processed block 14b falls within the range of the mesh display region 410 ("YES" in step S43), the controller 11 refers to the mesh information to decide the color of the currently-processed block 14b (step S44). For example, the controller 11 compares the passing frequency correlated with the currently-processed block 14b in the mesh information with a previously-set threshold, and decides the color of the block 14b based on a comparison result. For example, the controller 11 decides the color of the block 14b such that the block 14b having the color of the higher brightness is decided as the number of times the passing frequency exceeds the threshold increases. The color of the block 14b is an example of a display attribute in the mesh image 41. The display attribute of the block 14b is not limited to the brightness of the color. The display attribute of the block 14b may be saturation and hue. The display attribute of the block 14b may be a pattern. An example of a pattern that becomes the display attribute of the block 14b may include a hound's tooth check pattern and a stripe pattern.

Then, the controller 11 determines whether the currently-processed block 14b is the first block 14b in the mesh image 41 to be displayed (step S45). When the currently-processed block 14b is the first block 14b ("YES" in step S45), the controller 11 manages the currently-processed block 14b as a unit block 35a in FIG. 25C (step S46).

The unit block 35a corresponds to one block 14b in the mesh information in the mesh image 41. In the unit block 35a, the width $\Delta$x and the height $\Delta$y are set to be the same size. In the unit block 35a, the width $\Delta$x and the height $\Delta$y may be the same size or different sizes. In step S46, the controller 11 records the management information about the unit block 35a in the temporary storage 12. In the management information about the unit block 35a, the four points (x, y), (x+$\Delta$x, y), (x, y+$\Delta$y), (x+$\Delta$x, y+$\Delta$y) calculated in step S42 are managed while correlated with the color decided in step S44.

For example, in a state in which the first block 14b is managed, the controller 11 selects the new block 14b from the mesh information (step S41), and performs the pieces of processing from step S42. When the managed block 14b exists, the controller 11 determines that the currently-processed block 14b is not the first block 14b ("NO" in step S45).

When the currently-processed block 14b is not the first block 14b ("NO" in step S45), the controller 11 determines whether the managed block 14b exists on the left of the currently-processed block 14b based on the screen coordinates in the recorded management information (step S47). When the block 14b exists on the left of the currently-processed block 14b ("YES" in step S47), the controller 11 determines whether the color of the currently-processed block 14b is identical to the color of the block 14b on the left based on the color correlated with the management information about the block 14b on the left (step S48).

Figure 25C:
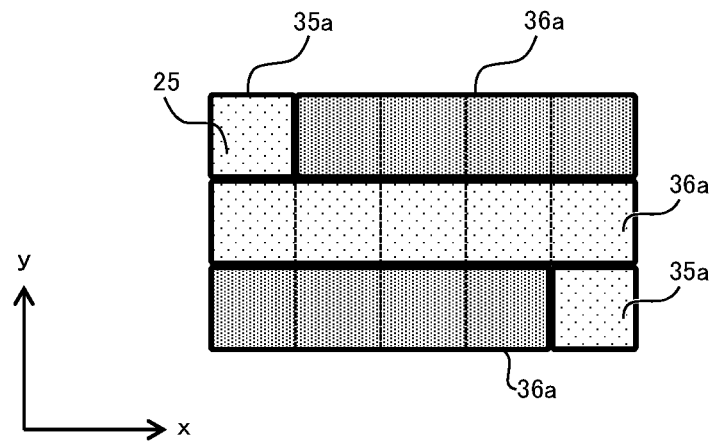
FIG. 25C is a view illustrating the mesh image generation processing in the information processing device according to the third embodiment.

When determining that the color of the currently-processed block 14b is identical to the color of the block 14b on the left ("YES" in step S48), as illustrated in FIG. 25C, the controller 11 manages the currently-processed block 14b and the block 14b on the left while integrating the currently-processed block 14b and the block 14b on the left into a coupled block 36a in which the block 14b and the block 14b are coupled to each other (step S49). FIG. 25C illustrates an example of the unit block 35a and the coupled block 36a. As illustrated in FIG. 25C, the coupled block 36a is formed by integrally coupling a plurality of adjacent unit blocks 35a in the width direction. The controller 11 records the management information about the coupled block 36a by, for example, updating the management information about the block 14b on the left.

For example, in the case where the block 14b on the left is managed as the unit block 35a, the management information before the update includes four points (x, y), (x+$\Delta$x, y), (x, y+$\Delta$y), (x+$\Delta$x, y+$\Delta$y). In step S49, the controller 11 rewrites two points (x+$\Delta$x, y), (x+$\Delta$x, y+$\Delta$y) into new values (x+2$\Delta$x, y), (x+2$\Delta$x, y+$\Delta$y) while maintaining the left two points (x, y), (x, y+$\Delta$y) in the management information about the unit block 35a. Consequently, the two unit blocks 35a are managed as one coupled block 36a.

On the other hand, when determining that the color of the currently-processed block 14b is not the same as the color of the block 14b on the left ("NO" in step S48), the controller 11 draws the managed block 14b (step S50). For example, the controller 11 designates the correlated color in the region of four vertices included in the management information using a predetermined command. For example, the predetermined command is based on OpenGL (registered trademark).

The controller 11 manages the currently-processed block 14b as the new unit block 35a (step S51). According to steps S50, S51, when the currently-processed block 14b is not coupled to the managed block 14b, the managed block 14b is drawn, and the currently-processed block 14b which is not coupled is newly managed.

Then, the controller 11 determines whether scanning of each block 14b in the mesh information is completed (step S52). When the scanning of the block 14b is not completed ("NO" in step S52), the controller 11 performs the pieces of processing from step S41 on the unprocessed block 14b included in the mesh information.

When determining that the currently-processed block 14b does not fall within the range of the mesh display region 410 ("NO" in step S43), the controller 11 proceeds to step S52 without performing the pieces of processing in steps S44 to S49. Consequently, the information processing device can reduce the processing load relating to the block 14b that is not displayed as the mesh image 41 by not performing the processing on the block 14b that does not fall within the range of the mesh display region 410 in the mesh of a predetermined range.

When determining that the block 14b on the left of the currently-processed block 14b does not exist ("NO" in step S47), the controller 11 draws the managed block 14b (step S50), and manages the currently-processed block 14b as the unit block 35a (step S51). Consequently, for example, when the currently-processed block 14b is located at the left end of the mesh display region 410, the block 14b located at the right end of the mesh display region 410 at another stage is drawn, and the block 14b at the left end is newly managed.

When determining that the scanning of the mesh information is completed ("YES" in step S52), the controller 11 draws the managed block 14b as the last block 14b of the mesh image 41 (step S53). Consequently, the controller 11 ends the processing in step S25 of FIG. 22, and proceeds to step S26.

According to the above processing, when the plurality of blocks 14b having the same display attribute are adjacent to each other in one row ("YES" in step S48), the plurality of adjacent blocks 14b are grouped in one coupled block 36a (step S49). The plurality of grouped unit blocks 35a can collectively be drawn by drawing the coupled block 36a (step S50).

The controller 11 integrates the plurality of blocks 14b such that the coupled block 36a has a rectangular shape (steps S48, S49). Consequently, one coupled block 36a can be drawn by designating four vertices similarly to one unit block 35a, and the processing load necessary to draw one coupled block 36a is equal to the case where one unit block 35a is drawn. Thus, the controller 11 can reduce the processing load necessary for the drawing by the number of the unit blocks 35a grouped as the coupled block 36a.

For example, in the example of FIG. 25C, a portion of three rows and five columns in which the plurality of unit blocks 35a are arranged is composed of three coupled blocks 36a and two unit blocks 35a. In this case, the processing load in which the drawing is performed 15 times in drawing each unit block 35a can be reduced to 5 times. The controller 11 may couple the blocks 14b having the same display attribute between adjacent rows such that the coupled block 36a becomes the rectangular shape as appropriate.

In the above processing, the number of blocks 14b that are grouped together as the same display attribute can be adjusted by appropriately setting the threshold for deciding the color of the block 14b in step S44. For example, more blocks 14b can be grouped by enlarging the interval between a plurality of thresholds, and the processing load can be reduced.

In the above processing, the controller 11 limits the block 14b drawn as the mesh image 41 to the range of the mesh display region 410 in the block 14b included in the mesh information ("NO" in step S43). Consequently, the information processing device can reduce the processing load during the drawing of the mesh image 41 by reducing the number of drawn blocks 14b. The range of the mesh display region 410 may be set in advance or changed by the user operation.

In the case where the mesh image 41 is displayed side by side while the blocks 14b of 20 m by 20 m are arranged in the region of 8 km by 12 km, it is necessary to calculate the coordinates of a total of 96,000 in 8 km by 50 by 12 km by 50 by 4 corners in order to superimpose and display the mesh image 41 on the map image 40. For this reason, the processing load of the information processing for displaying the information indicating the traveling area 14c where the moving body 5 can travel tends to become larger in the information processing device. In the third embodiment, the controller 11 performs the calculation processing of the display position so as to reduce the processing load necessary to draw the mesh image 41.

Figure 26:
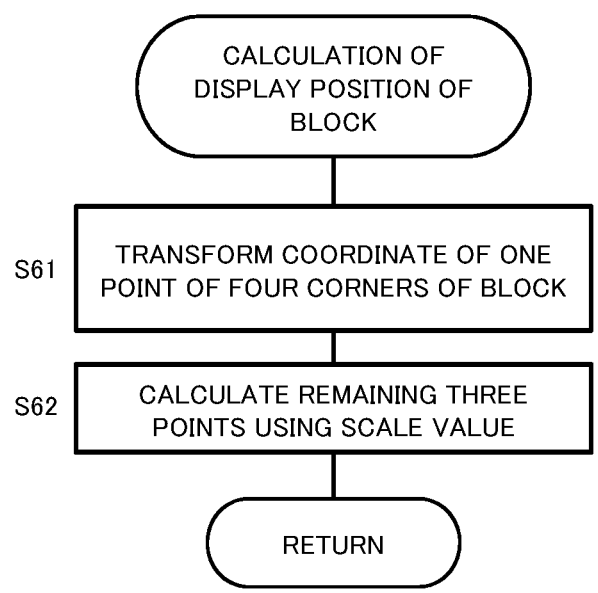
FIG. 26 is a flowchart illustrating processing of calculating a display position of a block according to the third embodiment.

The processing in step S42 of FIG. 24 will be described below with reference to FIG. 26. FIG. 26 is a flowchart illustrating the processing of calculating the display position of the block 14b.

Figure 24:
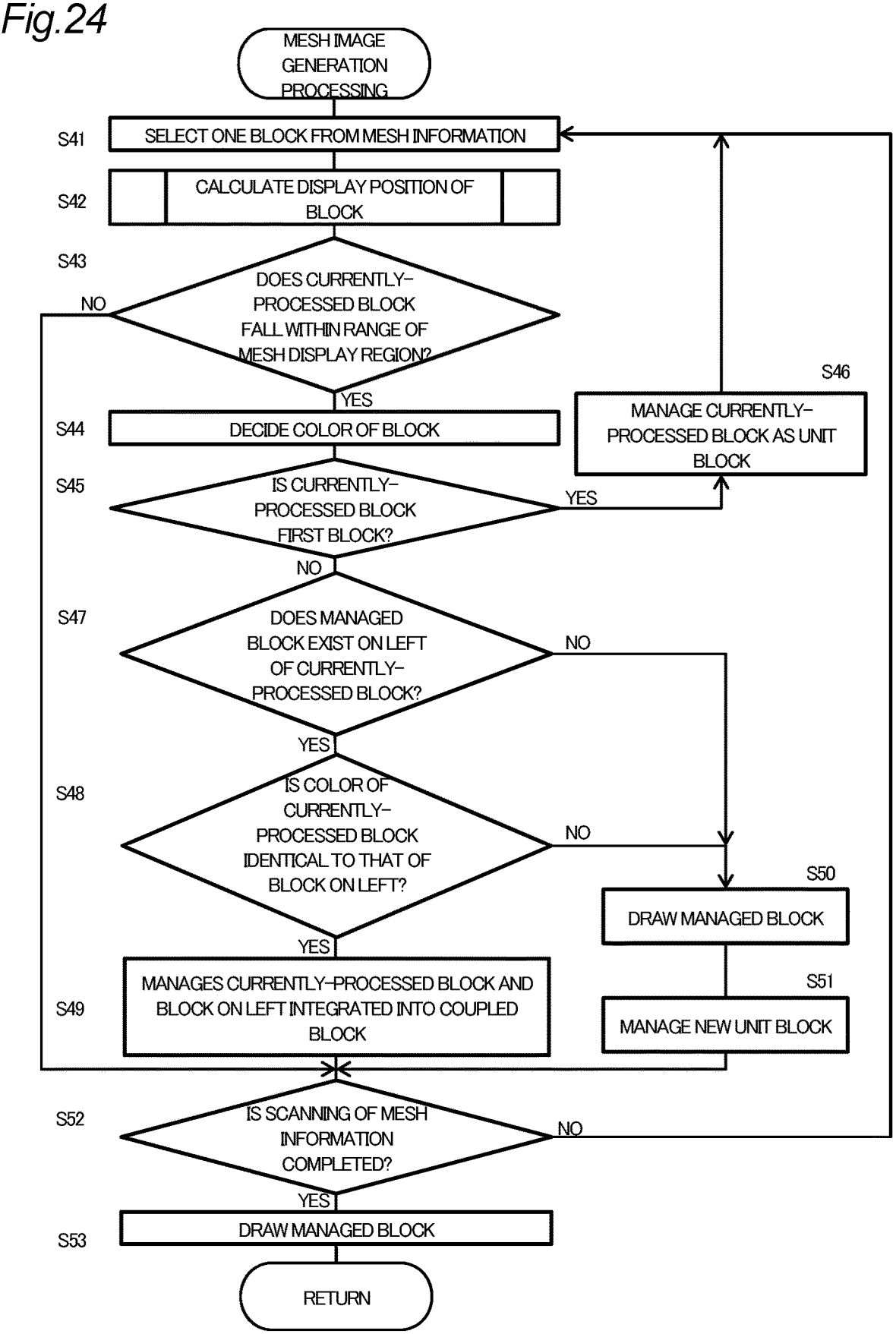
FIG. 24 is a flowchart illustrating mesh image generation processing in the information processing device according to the third embodiment.

First, the controller 11 transforms the coordinate of one point at the four corners of the block 14b selected in step S41 of FIG. 24 from a geographical coordinate into a screen coordinate (step S61). Consequently, for example, the screen coordinate of the point (x, y) at the lower left end of the block 14b in the example of FIG. 25B is calculated.

Then, the controller 11 calculates the screen coordinates of the remaining three points at the four corners of the block 14b based on the calculated screen coordinate and the scale information acquired in step S22 of FIG. 22 (step S62).

For example, at the time of the first selection in step S41 of FIG. 24, the controller 11 calculates the width $\Delta x$ and the height $\Delta y$ of the block 14b in the screen coordinate based on the information indicating the size of the block 14b in the geographical coordinate and the scale information. The controller 11 stores the calculation result in the temporary storage 12 or the like, and uses the width $\Delta x$ and the height $\Delta y$ based on the scale information as a fixed value in selecting the new block 14b.

In step S62, the controller 11 adds the width $\Delta x$ and the height $\Delta y$ based on the scale information to the calculated screen coordinates (x, y) to calculate the point (x+$\Delta x$, y) at the lower right end of the block 14b, the point (x, y+$\Delta y$) at the upper left end, and the point (x+$\Delta x$, y+$\Delta y$) at the upper right end in the screen coordinate. Consequently, the screen coordinates of the four corners of the selected block 14b are calculated.

When calculating the screen coordinates of the four corners of the selected block 14b (step S62), the controller 11 ends the processing in step S42 of FIG. 24, and proceeds to step S43.

According to the above processing, the controller 11 uses the width $\Delta x$ and the height $\Delta y$ based on the scale information as the fixed value (step S62), so that the number of calculation times of the coordinate transformation becomes one time during the calculation of the screen coordinates of the four corners of one block 14b. This enables the number of calculation times of coordinate transformation to be reduced ¼ times as compared with the case where the coordinate transformation is performed on each of the four corners of the block 14b. Thus, for example, when each block 14b of the mesh image 41 is aligned and displayed on the map image 40 as illustrated in FIG. 23, the data processing amount of the coordinate transformation from the geographical coordinate into the screen coordinate can be reduced. Consequently, a processing speed can be improved during the display of the mesh image 41.

Figure 27:
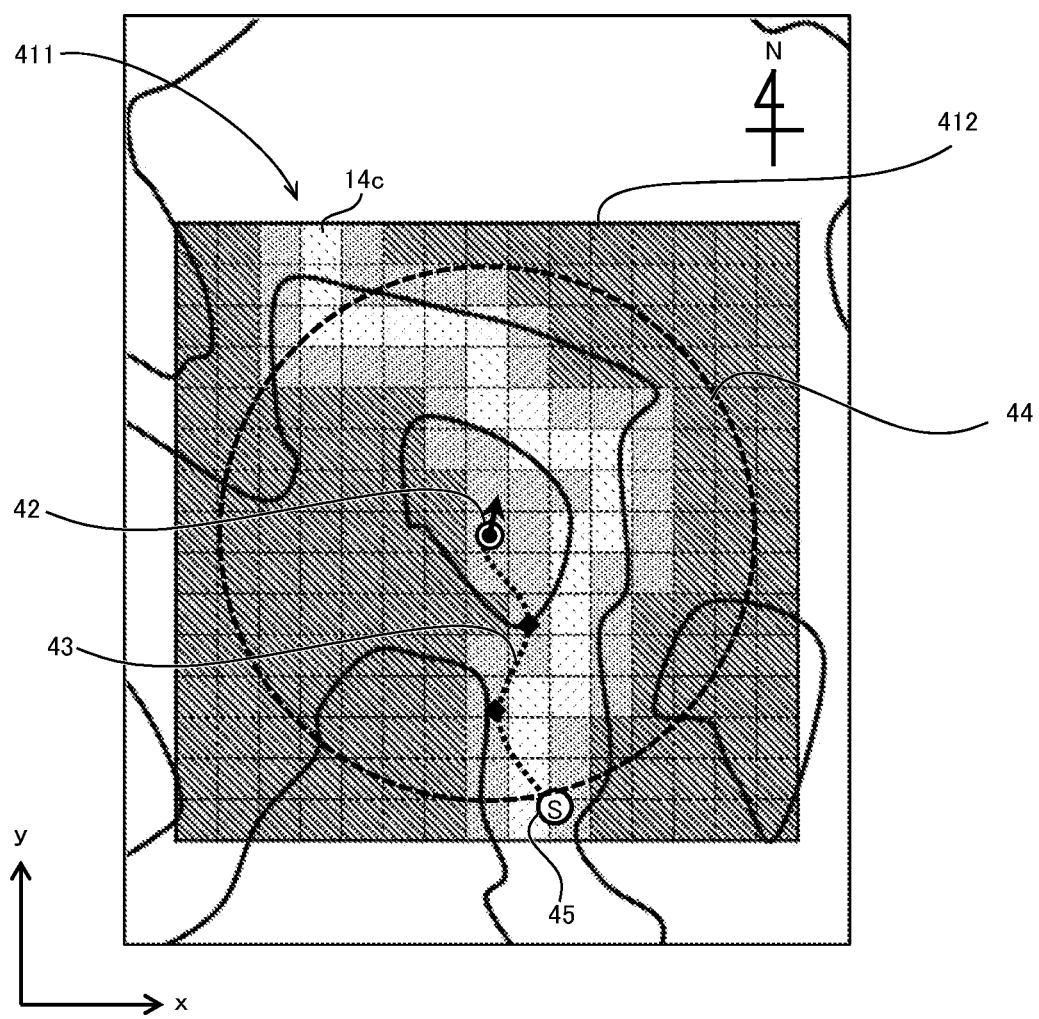
FIG. 27 is a view illustrating a mesh image in an information processing device according to a fourth embodiment.

The above processing is performed based on the scale information on the display screen of the display 14. FIG. 27 illustrates a display example of the display 14 when the scale is changed from FIG. 23. For example, when the scale of the display screen is changed by the user operation, the controller 11 performs the processing in FIG. 24 using the changed scale information, and displays a mesh image 411 as illustrated in FIG. 27.

At this point, similarly to the mesh display region 410 before the scale change, the controller 11 sets the range of the mesh display region 412 after the scale change such that a predetermined size is indicated on the geographical coordinate. The controller 11 calculates the display position of the block 14b in FIG. 26 using the width $\Delta x'$ and the height $\Delta y'$ of the block 14b corresponding to the changed scale information. The controller 11 can reduce the processing load of the drawing by limiting the range where the mesh image 411 is displayed on the display screen according to the changed scale.

As described above, the mobile terminal 1A, as an example of the information processing device of the third embodiment, is an example of the information processing device for displaying information indicating the traveling area 14c where the moving body 5 can travel. The mobile terminal 1A includes the display 14 and the controller 11. The display 14 includes the display screen that displays the image. The controller 11 causes the display 14 to display the mesh image 41 generated according to the mesh information defined by the position coordinate. The mesh information includes the plurality of blocks 14b each having the value relating to the traveling area 14c. Based on the mesh information, the controller 11 displays the blocks, which are adjacent to each other in the case where the values of adjacent blocks 14b belong to the same classification, as the grouped block using the display attribute in the mesh image. Consequently, the information processing device can reduce the processing load in the information processing of displaying the traveling area 14c where the moving body 5 can travel.

In the third embodiment, the controller 11 groups the adjacent blocks 14b based on the mesh information in the case where the values of adjacent blocks 14b belong to the same classification (step S49), and collectively designates the display attribute in the mesh image 41 to the grouped blocks 14b (step S50). Consequently, by the number of the grouped blocks 14b, the information processing device can reduce the processing load in generating the mesh image 41 as compared with the case where the display attribute is designated to each block 14b.

In the third embodiment, the block 14b constitutes the rectangular region. The controller 11 designates the display attribute in the region of each block 14b in the mesh image 41. The coupled block 36a obtained by grouping the blocks constitutes a rectangular region having the size corresponding to the plurality of unit blocks 35a. Consequently, the information processing device can draw one coupled block 36a with the processing load of one unit block 35a, and reduce the processing load by the number of blocks grouped in the coupled block 36a.

In the third embodiment, the controller 11 groups the adjacent blocks 14b in each block 14b aligned in a predetermined direction. The predetermined direction in which the blocks 14b are grouped can appropriately be set. The controller 11 can easily manage the coupled block 36a by determining whether the value of the block 14b belong to the same classification among the blocks 14b arranged in the predetermined direction (step S48).

In the third embodiment, the mobile terminal 1A further includes the storage 13. The scale information indicating the scale between the screen coordinate and the position coordinate on the display screen is stored in the storage 13. The controller 11 transforms one point in each block 14b in the position coordinate into the screen coordinate based on the mesh information (step S61), and calculates the position of the block 14b on the display screen based on the screen coordinate as a result of the transformation and the scale information (step S62). Consequently, in the information processing device, the number of calculation times of the coordinate transformation per one block 14b becomes one time, and the processing speed can be improved.

In the third embodiment, the display 14 limits the range where the mesh image 41 is displayed on the display screen to the specific mesh display region 410. The mesh display region 410 corresponds to the range having a predetermined size in the position coordinate. Consequently, the information processing device can reduce the processing load as compared with the case where the mesh image 41 is drawn to the outside of the mesh display region 410.

In the third embodiment, the display 14 displays each block 14b in the mesh image 41 with the display attribute decided by comparing one or a plurality of thresholds to the value of each block 14b in the mesh information. By appropriately setting the threshold, the information processing device can adjust the grouped block 14b, and improve the processing speed.

In the third embodiment, the display attribute of the block 14b represents the brightness of a predetermined color. The display 14 displays the higher brightness as the block 14b has the larger value in the mesh information. Consequently, the display 14 can make the block 14b having the larger value more visible to the user. The controller 11 may designate a lower brightness as the block 14b has a larger value.

In the third embodiment, the value of the block 14b indicates the passing frequency at which the moving body 5 passes through the region corresponding to each block 14b. Consequently, the controller 11 can generate the mesh image 41 such that the traveling area 14c is represented according to the passing frequency. The value of the block 14b may be an appropriate threshold determination result of the passing frequency of the moving body 5. The threshold determination of the passing frequency may be made by the server 2A.

In the third embodiment, the mobile terminal 1A further includes the network communication unit 151 configured to receive the mesh information from the server 2A. The mobile terminal 1A may generate the mesh image 41 based on the previously-stored mesh information.

In the third embodiment, the display 14 displays the mesh image 41 while superimposing the mesh image 41 on the image showing the map. Thus, the user can check the position and range of the mesh image 41 in the map image 40.

The program causing the mobile terminal 1A to generate the information indicating the traveling area 14c where the moving body 5 can travel is provided in the third embodiment. The controller 11 of the mobile terminal 1A executes the program to generate the mesh image 41 according to the mesh information defined by the position coordinate. The mesh information includes the plurality of blocks 14b each having the value relating to the traveling area 14c. By executing the program, the controller 11 groups the adjacent blocks 14b based on the mesh information in the case where values of the adjacent blocks 14b belong to the same classification, and collectively designates the display attribute in the mesh image 41 to the grouped block 14b. A non-transitory computer-readable recording medium to store the program may be provided.

Fourth Embodiment

The example in which the managed block 14b is sequentially drawn when the currently-processed block 14b is not coupled to the managed block 14b in the mesh image generation processing of FIG. 24 is described in the third embodiment. However, the mesh image generation processing is not limited to this example. The mesh image generation processing according to the fourth embodiment will be described below with reference to FIG. 28. In the fourth embodiment, the description of the configuration similar to that in the third embodiment will be omitted as appropriate.

Figure 28:
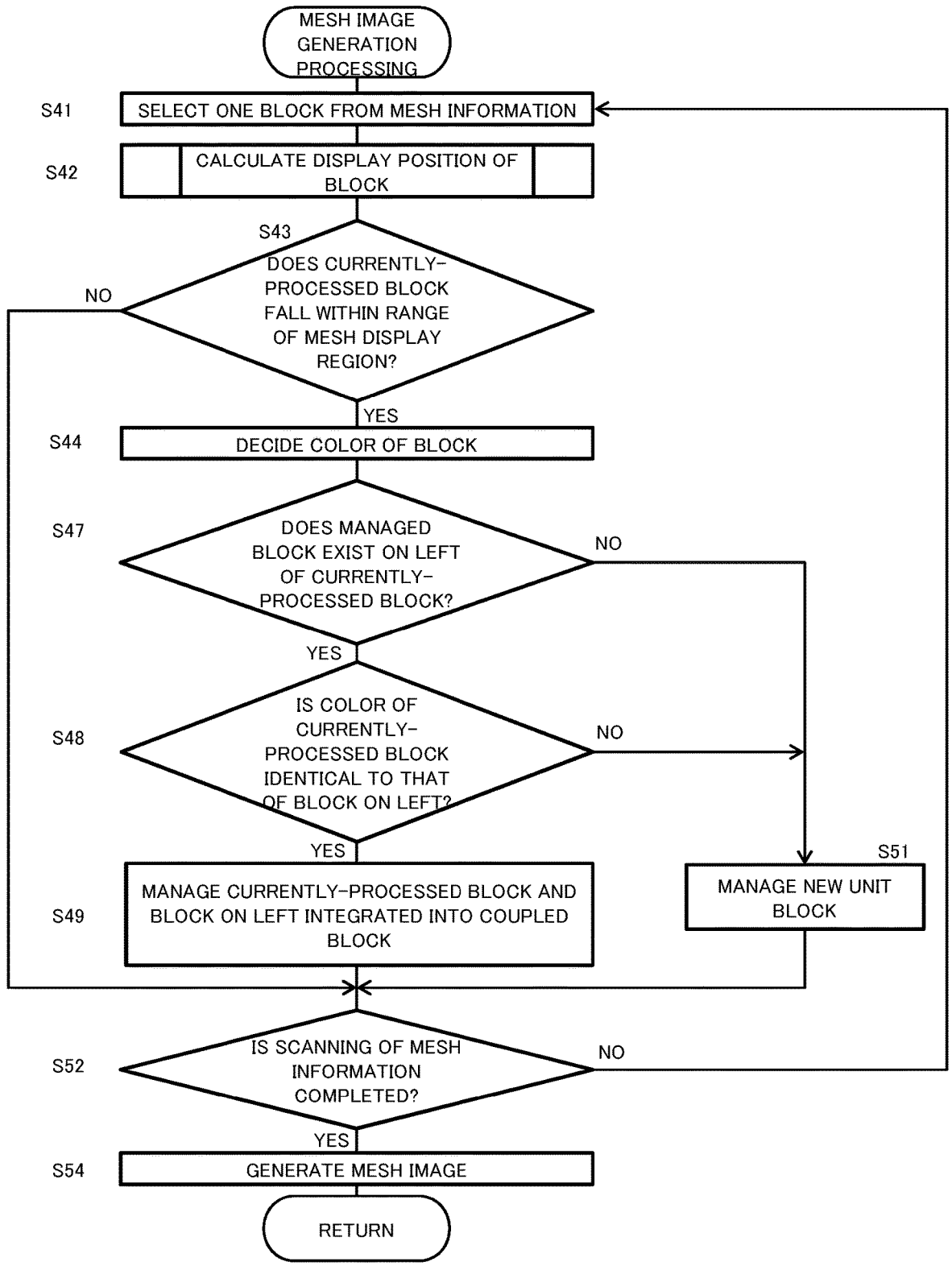
FIG. 28 is a flowchart illustrating mesh image generation processing in the information processing device according to the fourth embodiment.

In the mesh image generation processing in FIG. 28, the controller 11 performs processing of managing the way to draw all the blocks 14b included in the mesh image 41 in steps S41 to S52. For example, when determining that the color of the currently-processed block 14b is not the same as the color of the block 14b on the left ("NO" in step S48), the controller 11 manages the new unit block 35a while continuing the management of the block 14b on the left (step S51).

After the pieces of processing in steps S41 to S51 are completed ("YES" in step S52), the controller 11 generates a mesh image 41 so as to draw all the managed blocks 14b (step S54). Also in the above processing, the adjacent blocks 14b having the same color are grouped as the coupled block 36a (step S49), so that the display attribute can collectively be designated to the region of the plurality of unit blocks 35a. Consequently, the information processing device can reduce the processing load when drawing the mesh image 41.

Other Embodiments

In each of the above embodiments, the mobile terminal 1A is described as an example of the information processing device. The information processing device of the present invention is not limited to a mobile terminal 1A. For example, the information processing device may be a navigation device mounted on the moving body 5 or the server 2A. The server controller 21 of the server 2A may generate the mesh image 41 similarly to each of the above embodiments, or display the mesh image 41 on the display separately provided in the server 2A.

In each of the above embodiments, a buggy is described as an example of the moving body 5. The moving body 5 is not limited to a buggy, but may be various vehicles including two wheel vehicles, snowmobiles, or drones. The information processing device of the above embodiments can be applied to various moving bodies 5.

Although the specific embodiments of the present invention are described as above, the present invention is not limited to the above embodiments, and various modifications may be made within the scope of the present invention. For example, one obtained by appropriately combining the contents of the above individual embodiments can be one embodiment of the present invention.

The first to fourth embodiments may be configured by appropriately applying some configurations. The present invention can be implemented in various other forms without departing from the spirit, gist, or main characteristics of the present invention. Therefore, the above-described embodiments are merely illustrative in all respects, and should not be interpreted restrictively. That is, the present invention is an information processing device, an information processing system including an information processing device, and an information processing program by taking the above embodiment as an example.

The scope of the present invention is indicated by the scope of the claims, and is not bound in any way in the specification. All variations and modifications belonging to the equivalent range of the claims are within the scope of the present invention.

Any of the above information processing programs can be configured to be provided as a computer program product while recoded in a computer-readable non-transitory recording medium such as Compact Disk Read Only Memory (CD-ROM), a flexible disk, and a Digital Versatile Disk (DVD) in an installable format or a executable format.

What is claimed is:

1. An information processing device comprising a display configured to display a mesh of mesh information based on longitude and latitude,
    wherein the mesh is composed of a plurality of blocks,
    wherein the mesh information includes area information about a traveling area where a moving body can travel,
    wherein the area information is additional information added to each of the plurality of blocks,
    wherein the additional information is display information that is weighted and sorted, based on the number of overlapping points of a plurality of locus logs,
    wherein the information processing device further comprises an acquisition unit configured to acquire positional information about a current position of the moving body,
    wherein the acquisition unit acquires remaining information about an energy source causing the moving body to travel, and
    wherein the display displays the positional information about the current position and a movable area which is a range where the moving body is movable from the current position.

2. The information processing device according to claim 1, further comprising a controller configured to change a scale of the mesh based on the longitude and the latitude so as to display the positional information about the current position and a whole of the movable area on the display.

3. The information processing device according to claim 1, wherein
    the display displays a start position at which the moving body starts movement and a current position of the moving body, and
    outputs a warning when the start position is located outside the movable area.

4. A non-transitory computer readable recording medium storing an information processing program to make a computer perform a display step of displaying a mesh of mesh information based on longitude and latitude,
    wherein the mesh is composed of a plurality of blocks,
    wherein the mesh information includes area information about a traveling area where a moving body can travel,
    wherein the area information is additional information added to each of the plurality of blocks, wherein the additional information is display information that is weighted and sorted, based on the number of overlapping points of a plurality of locus logs, wherein the information processing program further makes the computer perform an acquisition step of acquiring positional information about a current position of the moving body, wherein the acquisition step acquires remaining information about an energy source causing the moving body to travel, and wherein the display step displays the positional information about the current position and a movable area which is a range where the moving body is movable from the current position.

* * * * *